United States Patent
Xiao et al.

(10) Patent No.: US 9,734,179 B2
(45) Date of Patent: Aug. 15, 2017

(54) CONTINGENCY TABLE GENERATION

(71) Applicant: SAS Institute Inc., Cary, NC (US)

(72) Inventors: Yongqiao Xiao, Cary, NC (US);
Taiyeong Lee, Cary, NC (US); Jared Langford Dean, Cary, NC (US);
Ruiwen Zhang, Cary, NC (US)

(73) Assignee: SAS Institute Inc., Cary, NC (US)

( * ) Notice: Subject to any disclaimer, the term of this patent is extended or adjusted under 35 U.S.C. 154(b) by 322 days.

(21) Appl. No.: 14/571,756

(22) Filed: Dec. 16, 2014

(65) Prior Publication Data

US 2015/0324398 A1    Nov. 12, 2015

Related U.S. Application Data

(60) Provisional application No. 61/990,097, filed on May 7, 2014, provisional application No. 62/002,183, filed on May 23, 2014.

(51) Int. Cl.
*G06F 17/30* (2006.01)

(52) U.S. Cl.
CPC .. *G06F 17/30327* (2013.01); *G06F 17/30289* (2013.01); *G06F 17/30339* (2013.01); *G06F 17/30345* (2013.01); *G06F 17/30507* (2013.01); *G06F 17/30587* (2013.01)

(58) Field of Classification Search
CPC combination set(s) only.
See application file for complete search history.

(56) References Cited

U.S. PATENT DOCUMENTS

| | | | |
|---|---|---|---|
| 5,841,376 A | 11/1998 | Hayashi | |
| 6,665,669 B2 | 12/2003 | Han et al. | |
| 6,728,955 B1 * | 4/2004 | Berry | G06F 11/3409 714/E11.192 |
| 6,978,271 B1 * | 12/2005 | Hoffman | G06F 17/30091 |

(Continued)

FOREIGN PATENT DOCUMENTS

| | | |
|---|---|---|
| CN | 102737107 | 10/2012 |
| CN | 102637208 | 10/2013 |

(Continued)

OTHER PUBLICATIONS

Alternating decision tree, Available from http://en.wikipedia.org/wiki/Alternating_decision_tree on Mar. 17, 2013.

(Continued)

*Primary Examiner* — Etienne Leroux
(74) *Attorney, Agent, or Firm* — Bell & Manning, LLC

(57) ABSTRACT

A method of creating a contingency table is provided. Whether or not a variable level list exists for a second variable in tree data is determined. When the variable level list exists for the second variable in the tree data, a first node memory structure is determined for the second variable from the variable level list, a first value of a first variable is determined using a first observation indicator and the tree data, and a first counter value is added to the contingency table in association with the first value of the first variable and a first value of the second variable. The first node memory structure includes the first value indicator, the first counter value, and the first observation indicator. The first value indicator indicates a first value of the second variable.

27 Claims, 17 Drawing Sheets

(56) References Cited

U.S. PATENT DOCUMENTS

| | | |
|---|---|---|
| 7,379,926 B1 | 5/2008 | Belniak et al. |
| 8,244,752 B2 | 8/2012 | Buehrer et al. |
| 8,581,914 B2 | 11/2013 | Zhou et al. |
| 8,645,380 B2 | 2/2014 | Wang et al. |
| 2008/0123561 A1 | 5/2008 | Sharma et al. |
| 2008/0275683 A1 | 11/2008 | Pang et al. |
| 2009/0157997 A1 | 6/2009 | Leonenko |
| 2010/0332430 A1 | 12/2010 | Caraviello et al. |
| 2012/0025997 A1 | 2/2012 | Liu et al. |
| 2013/0235050 A1 | 9/2013 | Karras |
| 2013/0328876 A1 | 12/2013 | Keely |
| 2014/0067806 A1 | 3/2014 | Chandrasekhar |
| 2014/0095424 A1 | 4/2014 | Sakurai et al. |
| 2015/0324403 A1 | 11/2015 | Xiao et al. |

FOREIGN PATENT DOCUMENTS

| | | |
|---|---|---|
| WO | WO 2007124616 | 11/2007 |
| WO | WO 2012061162 | 5/2012 |

OTHER PUBLICATIONS

Data Mining Algorithms in R/Frequent Pattern Mining/the FP-Growth Algorithm, Available from http://en.wikibooks.org/wiki/Data_Mining_Algorithms_In_R/Frequent_Pattern_Mining/The_FP-Growth_Algorithm on May 5, 2014.

Moore et al., Cached Sufficient Statistics for Efficient Machine Learning with Large Datasets, Journal of Artificial Intelligence Research, vol. 8, Mar. 1998, pp. 67-91.

Han et al., Mining Frequent Patterns without Candidate Generation: A Frequent-Pattern Tree Approach, Data Mining and Knowledge Discovery, vol. 8, 2004, pp. 53-87.

J. Bentley, Multidimensional Binary Search Trees Used for Associative Searching, Communications of the ACM, vol. 18, No. 9, Sep. 1975, pp. 509-517.

* cited by examiner

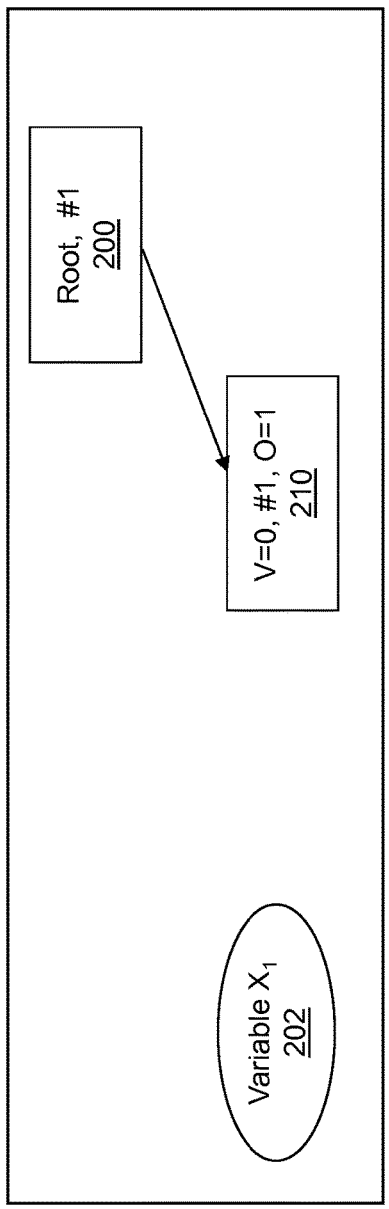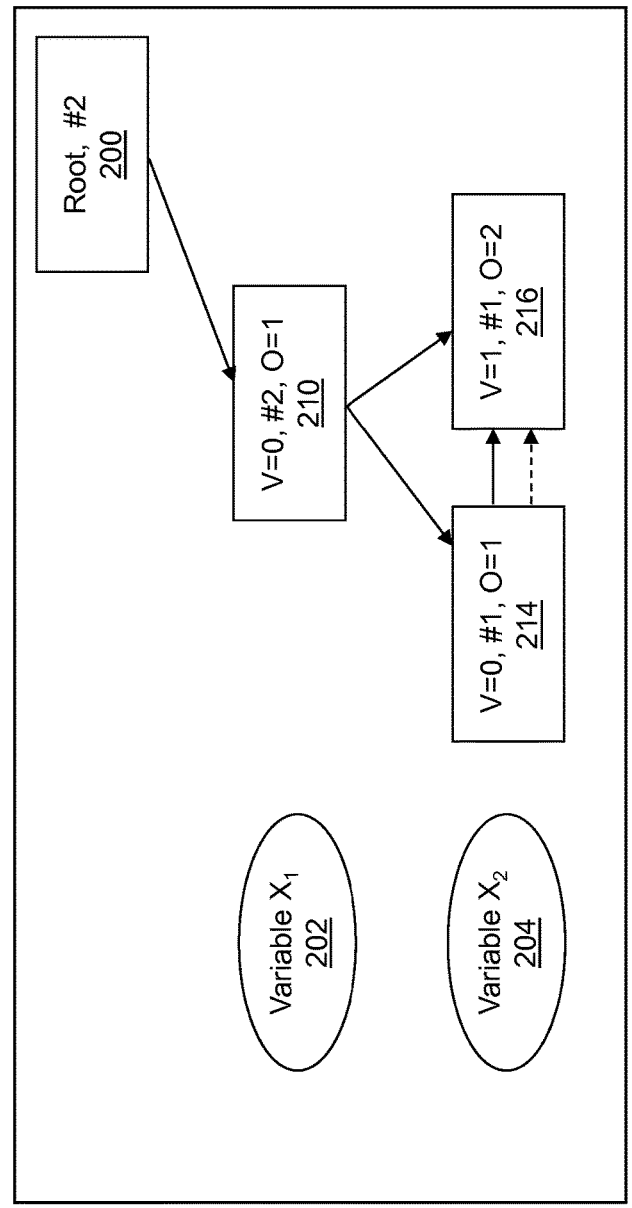

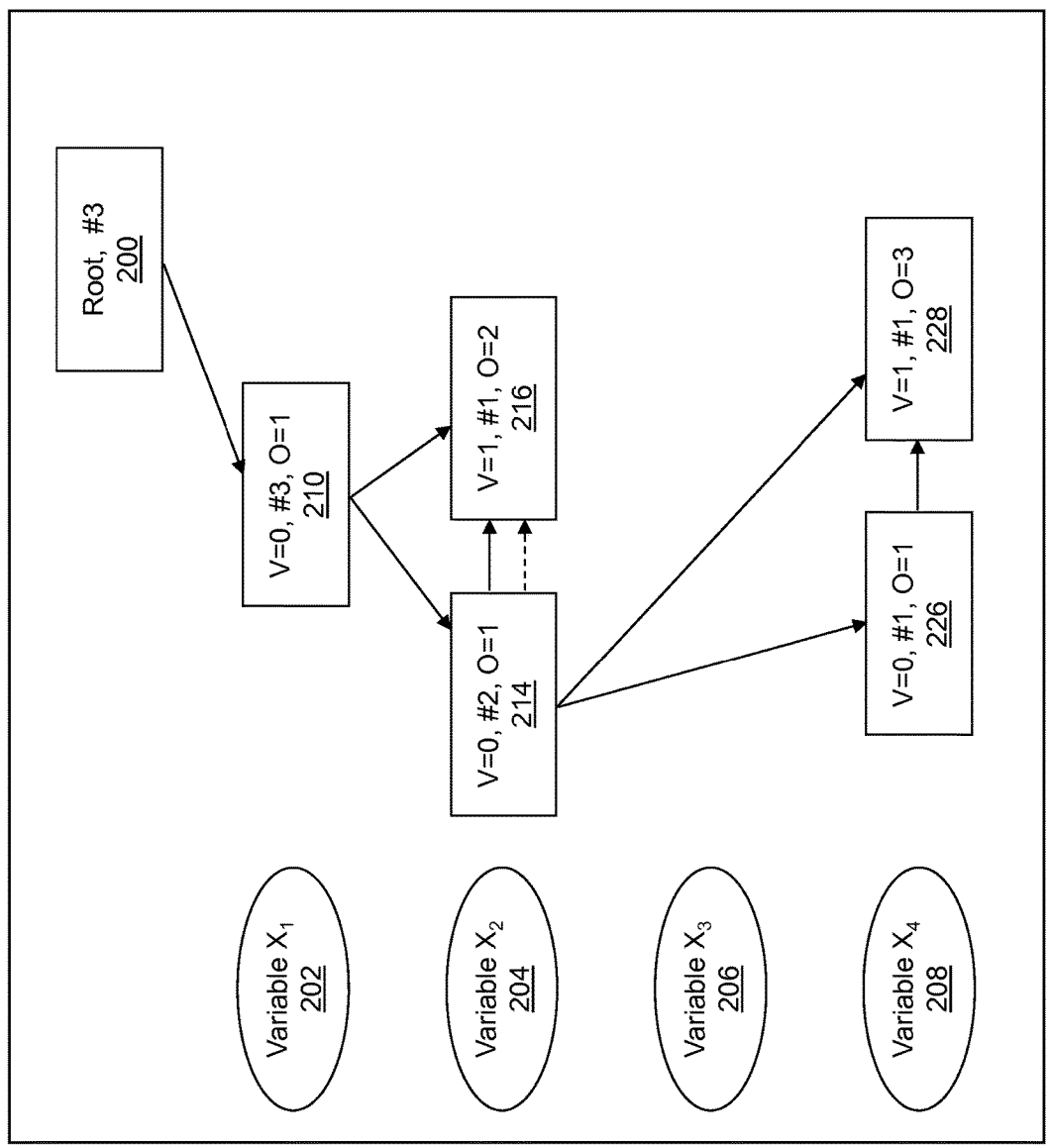

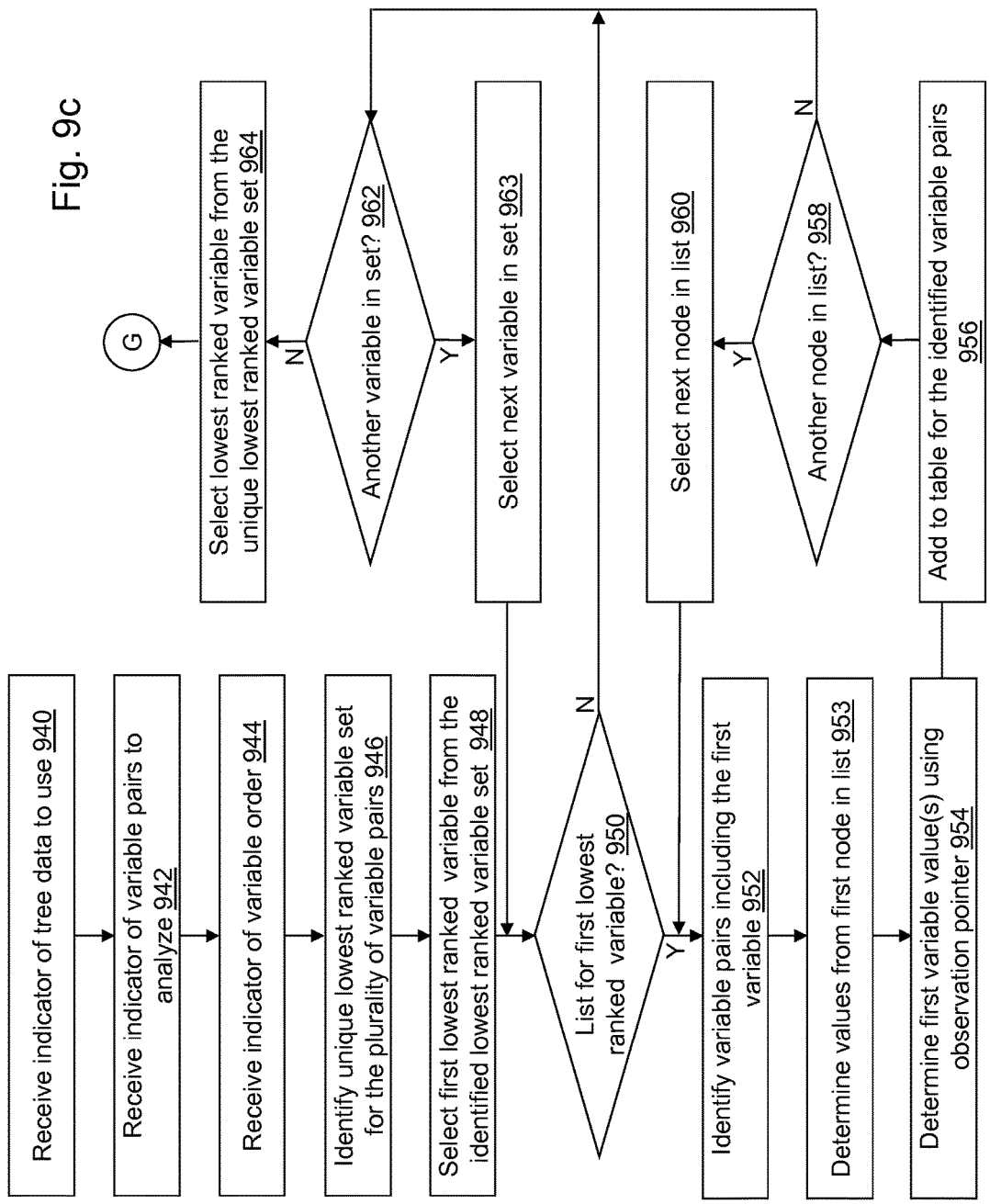

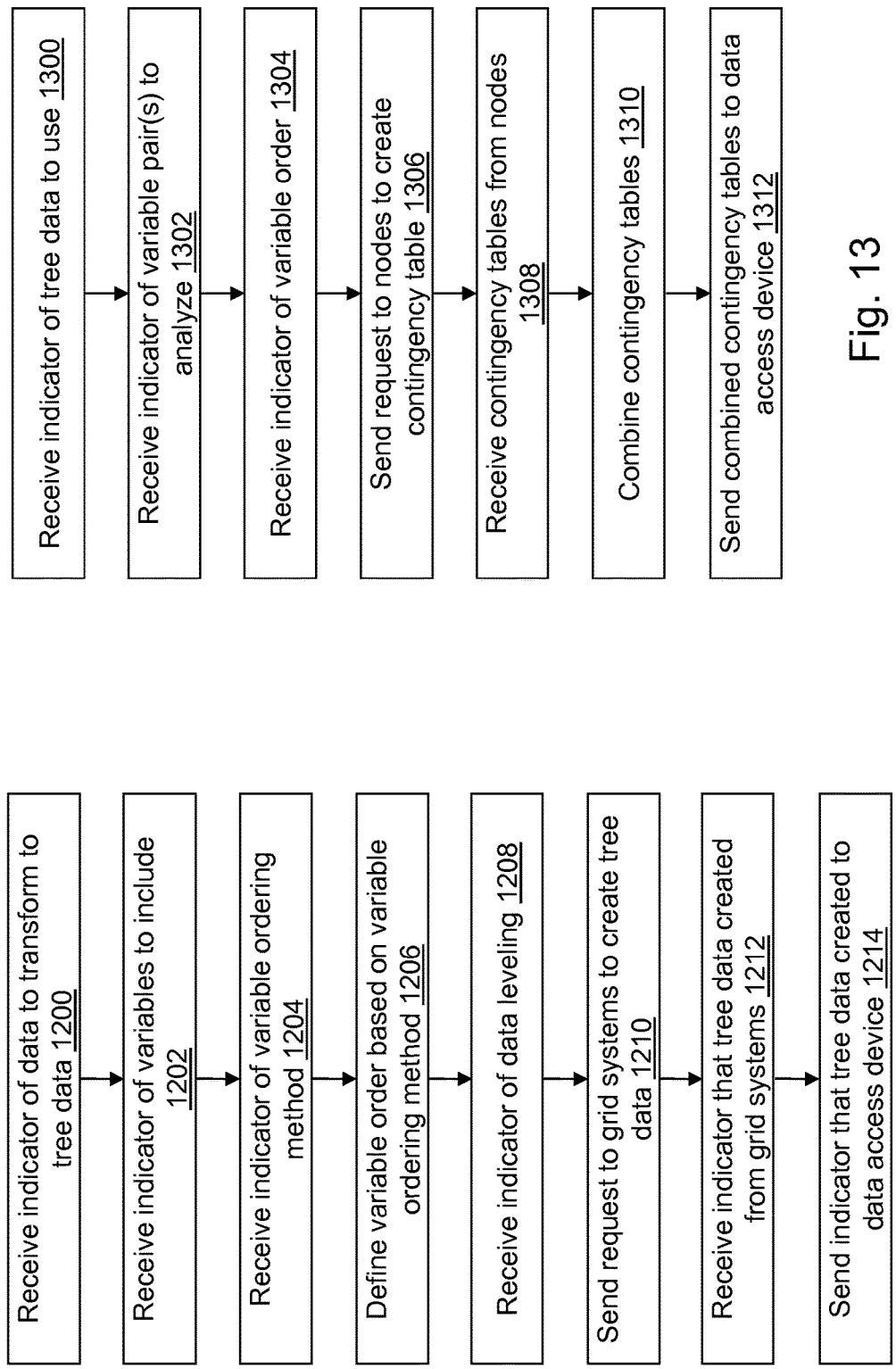

CONTINGENCY TABLE GENERATION

CROSS-REFERENCE TO RELATED APPLICATIONS

The present application claims the benefit of priority of 35 U.S.C. §119(e) to U.S. Provisional Patent Application Nos. 61/990,097, filed on May 7, 2014, and 62/002,183, filed on May 23, 2014, the entire contents of which are hereby incorporated by reference.

BACKGROUND

A contingency table is a type of table that displays a multivariate, frequency distribution of variables, for example. In statistics, a contingency table may be used for independence testing, such as in performance of a Chi-square test. In data mining, a contingency table may be used to build decision trees, to learn Bayesian networks, to mine frequency patterns, etc.

SUMMARY

In an example embodiment, a method of creating a contingency table is provided. A first variable indicator indicates a first variable to include in a contingency table. A second variable indicator indicates a second variable to include in the contingency table. Whether or not a variable level list exists for the second variable in tree data is determined. When the variable level list exists for the second variable in the tree data, a first node memory structure is determined for the second variable from the variable level list, wherein the first node memory structure includes a first value indicator, a first counter value, and a first observation indicator; a first value of the first variable is determined using the first observation indicator and the tree data; and the first counter value is added to the contingency table in association with the first value of the first variable and the first value of the second variable. The first value indicator indicates a first value of the second variable In another example embodiment, a computer-readable medium is provided having stored thereon computer-readable instructions that, when executed by a computing device, cause the computing device to perform the method of creating a contingency table.

In yet another example embodiment, a computing device is provided. The system includes, but is not limited to, a processor and a computer-readable medium operably coupled to the processor. The computer-readable medium has instructions stored thereon that, when executed by the computing device, cause the computing device to perform the method of creating a contingency table.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 3 depicts processing of a first observation when creating the first tree data structure of FIG. 2 in accordance with an illustrative embodiment.

FIG. 4 depicts processing of a second observation when creating the first tree data structure of FIG. 2 in accordance with an illustrative embodiment.

FIG. 5 depicts processing of a third observation when creating the first tree data structure of FIG. 2 in accordance with an illustrative embodiment.

FIGS. 9a-9d depict a flow diagram illustrating examples of operations performed by the data conversion device of FIG. 8 in accordance with an illustrative embodiment.

FIG. 12 depicts a flow diagram illustrating examples of operations performed by the grid control device of FIG. 11 in accordance with an illustrative embodiment.

FIG. 13 depicts a second flow diagram illustrating examples of operations performed by the grid control device of FIG. 11 in accordance with an illustrative embodiment.

DETAILED DESCRIPTION

Figure 1:
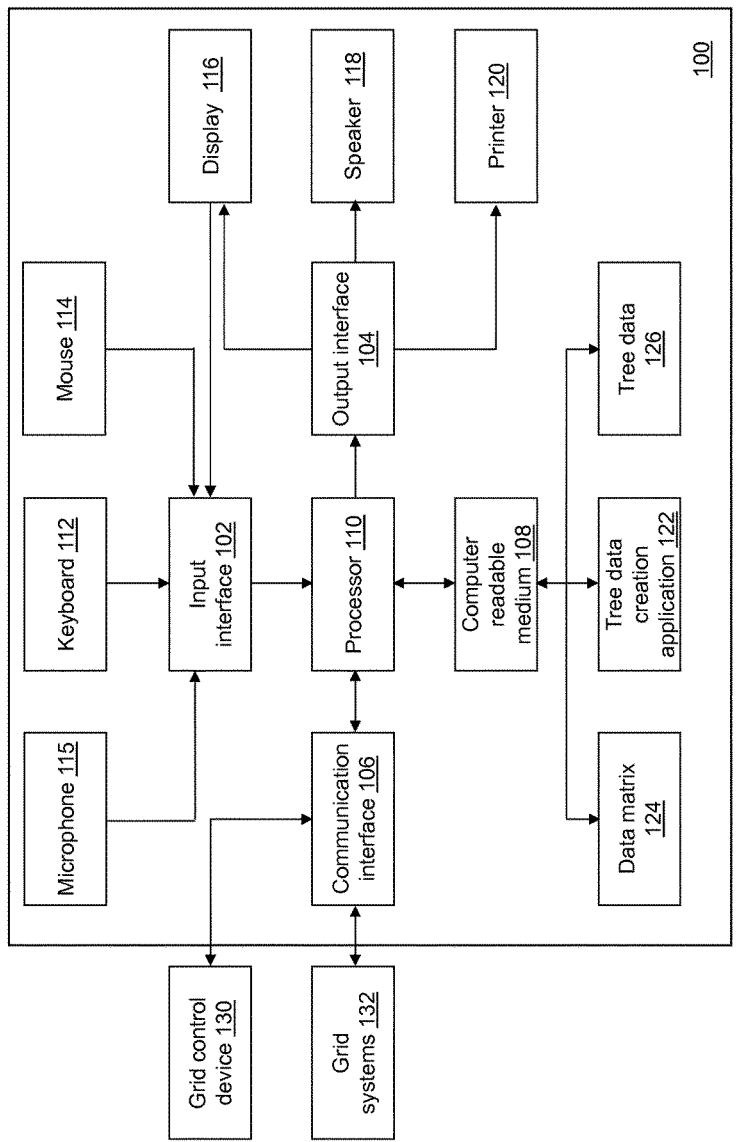
FIG. 1 depicts a block diagram of a data conversion device in accordance with an illustrative embodiment.

Referring to FIG. 1, a block diagram of a data conversion device 100 is shown in accordance with an illustrative embodiment. Data conversion device 100 may include an input interface 102, an output interface 104, a communication interface 106, a computer-readable medium 108, a processor 110, a tree data creation application 122, a data matrix 124, and tree data 126. Fewer, different, and/or additional components may be incorporated into data conversion device 100.

Input interface 102 provides an interface for receiving information from the user for entry into data conversion device 100 as understood by those skilled in the art. Input interface 102 may interface with various input technologies including, but not limited to, a keyboard 112, a mouse 114, a microphone 115, a display 116, a track ball, a keypad, one or more buttons, etc. to allow the user to enter information into data conversion device 100 or to make selections presented in a user interface displayed on the display. The same interface may support both input interface 102 and output interface 104. For example, display 116 comprising a touch screen provides user input and presents output to the user. Data conversion device 100 may have one or more input interfaces that use the same or a different input interface technology. The input interface technology further may be accessible by data conversion device 100 through communication interface 106.

Output interface 104 provides an interface for outputting information for review by a user of data conversion device 100 and/or for use by another application. For example, output interface 104 may interface with various output technologies including, but not limited to, display 116, a speaker 118, a printer 120, etc. Data conversion device 100 may have one or more output interfaces that use the same or a different output interface technology. The output interface technology further may be accessible by data conversion device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data conversion device 100 may have one or more communication interfaces that use the same or a different communication interface technology. For example, data conversion device 100 may support communication using an Ethernet port, a Bluetooth antenna, a telephone jack, a USB port, etc. Data and messages may be transferred between data conversion device 100 and/or a grid control device 130 and/or grid systems 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data conversion device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Data conversion device 100 also may have one or more drives that support the loading of a memory media such as a CD, DVD, an external hard drive, etc. One or more external hard drives further may be connected to data conversion device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data conversion device 100 may include a plurality of processors that use the same or a different processing technology.

Tree data creation application 122 performs operations associated with creating tree data 126 from data stored in data matrix 124. The created tree data 126 facilitates creation of contingency tables. Some or all of the operations described herein may be embodied in tree data creation application 122. The operations may be implemented using hardware, firmware, software, or any combination of these methods. Referring to the example embodiment of FIG. 1, tree data creation application 122 is implemented in software (comprised of computer-readable and/or computer-executable instructions) stored in computer-readable medium 108 and accessible by processor 110 for execution of the instructions that embody the operations of tree data creation application 122. Tree data creation application 122 may be written using one or more programming languages, assembly languages, scripting languages, etc.

Tree data creation application 122 may be implemented as a Web application. For example, tree data creation application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Data matrix 124 includes a plurality of rows and columns. The rows of data matrix 124 may be referred to as observations, and the columns may be referred to as variables. Of course, in an alternative embodiment, data matrix 124 may be transposed or stored using a different format as long as observation values associated with different variables can be delineated.

The data stored in data matrix 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Data matrix 124 may be stored in computer-readable medium 108 or on one or more other computing devices and accessed using communication interface 106. Data matrix 124 may be stored using various formats as known to those skilled in the art including a file system, a relational database, a system of tables, a structured query language database, etc. For example, data matrix 124 may be stored in a cube distributed across a grid of computers as understood by a person of skill in the art. As another example, data matrix 124 may be stored in a multi-node Hadoop® cluster, as understood by a person of skill in the art.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, convert variables, perform exploratory analysis, build and compare models and score. Some systems may use SAS In-Memory Statistics for Hadoop® to read big data once and analyze it several times by persisting it in-memory for the entire session. Some systems may be of other types, designs and configurations.

Figure 2:
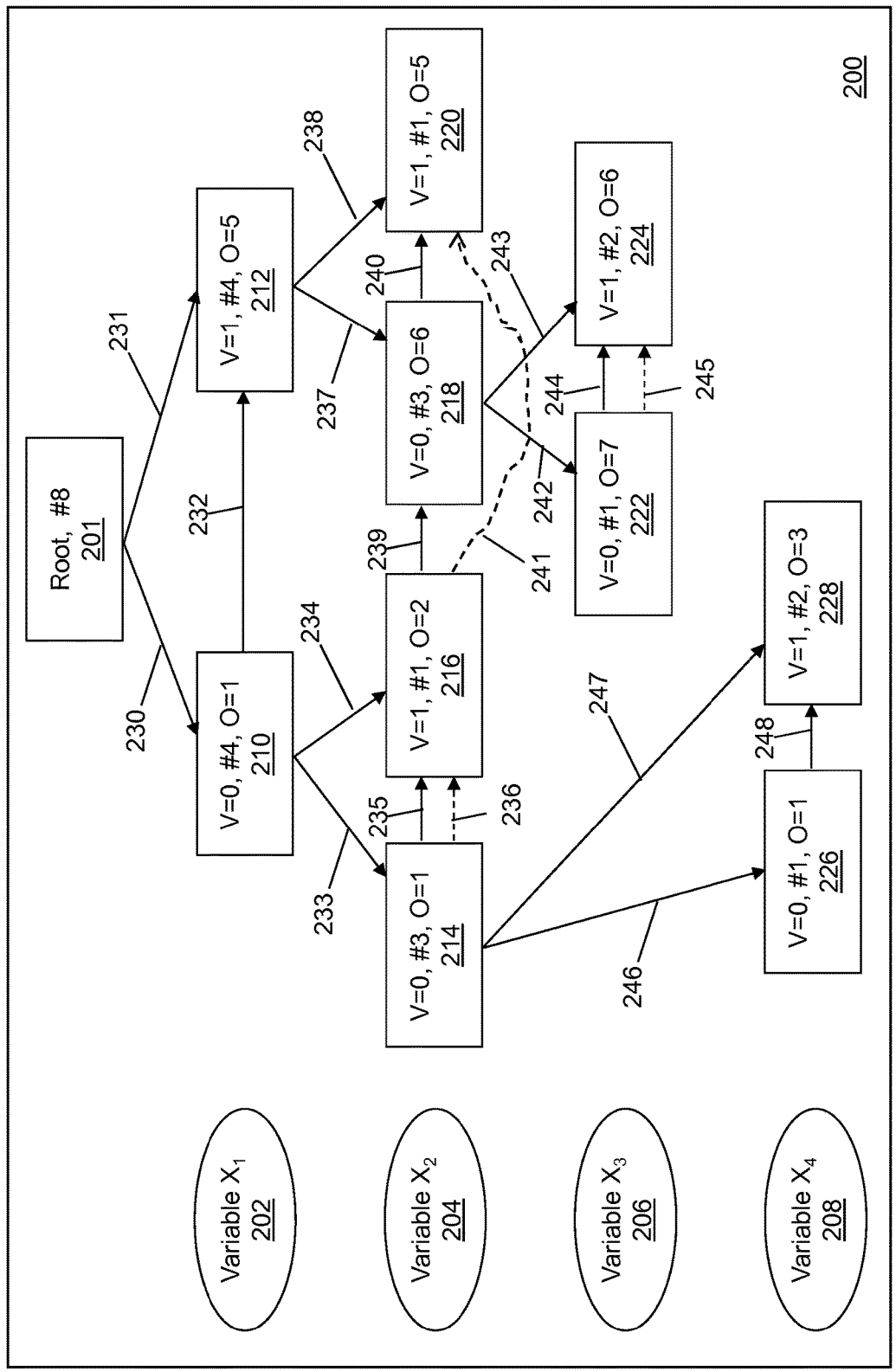
FIG. 2 depicts a first tree data structure in accordance with an illustrative embodiment.

Referring to FIG. 2, a first tree data structure 200 is shown in accordance with an illustrative embodiment. In the illustrative embodiment, first tree data structure 200 was created from data matrix 124 comprised of data shown in Table I below:

TABLE I

| Observation # | Variable $X_1$ | Variable $X_2$ | Variable $X_3$ | Variable $X_4$ |
|---|---|---|---|---|
| 1 | 0 | 0 | 0 | 0 |
| 2 | 0 | 1 | 1 | 0 |
| 3 | 0 | 0 | 0 | 1 |
| 4 | 0 | 0 | 0 | 1 |
| 5 | 1 | 1 | 0 | 1 |
| 6 | 1 | 0 | 1 | 0 |
| 7 | 1 | 0 | 0 | 0 |
| 8 | 1 | 0 | 1 | 0 |

In the illustrative embodiment, data matrix 124 includes eight rows associated with eight observations and four variables, $X_1$, $X_2$, $X_3$, and $X_4$, where each variable has two possible values '0' and '1'. Data points are associated with an observation and variable pair. Data matrix 124 can include any number of observations and any number of variables. The data points can include any number of different possible values. Use of the two possible values '0' and '1' is merely for simplicity of illustration. As understood by a person of skill in the art, the data associated with one or more columns may be levelized to convert arbitrary values to a discrete set of possible values. Using levelized values may allow the data to be stored using a fewer number of bits. Additionally, the columns may be stored in a pre-determined priority order such that the data associated with variable $X_1$ is more important than the data associated with variable $X_2$, the data associated with variable $X_2$ is more important than the data associated with variable $X_3$, and so on. Alternatively, an order may be defined for the variables even though the columns are not organized in that order.

First tree data structure 200 includes a root node 201. Root node 201 references a root node memory structure that may include a root counter value. As used herein, a memory structure may include values associated with one or more parameters associated with a type of memory structure, where the value(s) of the one or more parameters may be stored contiguously in memory using a predetermined amount of memory for each parameter, may be stored using one or more pointers to memory locations that store the values, may be stored using comma delimited text, may be stored using tab delimited text, etc. as understood by a person of skill in the art. The root counter value may indicate a total number of observations included in data matrix 124. In the illustrative embodiment of Table I, the root counter value associated with root node 201 indicates that data matrix 124 includes eight observations indicated by "#8".

First tree data structure 200 further includes a variable level node defined for one or more of the variables associated with data matrix 124. In the illustrative embodiment of Table I, first tree data structure 200 includes a variable $X_1$ level node 202, a variable $X_2$ level node 204, a variable $X_3$ level node 206, and a variable $X_4$ level node 208. Each variable level node 202, 204, 206, 208 references a variable level node memory structure that may include a variable indicator, such as a variable name and/or a variable column number, a variable levelized value mapping, etc. Variable $X_1$ level node 202, variable $X_2$ level node 204, a variable $X_3$ level node 206, and variable $X_4$ level node 208 may be linked to each other and/or to root node 201. For example, variable $X_1$ level node 202, variable $X_2$ level node 204, a variable $X_3$ level node 206, and variable $X_4$ level node 208 may be stored as an array, as a list, a linked list, etc. in association with root node 201.

Additionally, one or more variable value nodes may be stored in association with each variable level node 202, 204, 206, 208. For example, first tree data structure 200 further includes a first variable $X_1$ node 210, a second variable $X_1$ node 212, a first variable $X_2$ node 214, a second variable $X_2$ node 216, a third variable $X_2$ node 218, a fourth variable $X_2$ node 220, a first variable $X_3$ node 222, a second variable $X_3$ node 224, a first variable $X_4$ node 226, and a second variable $X_4$ node 228. First variable $X_1$ node 210 and second variable $X_1$ node 212 may be stored in association with variable $X_1$ level node 202. For example, first variable $X_1$ node 210 and second variable $X_1$ node 212 may be stored as an array, as a list, a linked list, etc. in association with variable $X_1$ level node 202. First variable $X_1$ node 210 and second variable $X_1$ node 212 may be referred to as first and second variable one value nodes, respectively.

First variable $X_2$ node 214, second variable $X_2$ node 216, third variable $X_2$ node 218, and fourth variable $X_2$ node 220 may be stored in association with variable $X_2$ level node 204. For example, first variable $X_2$ node 214, second variable $X_2$ node 216, third variable $X_2$ node 218, and fourth variable $X_2$ node 220 may be stored as an array, as a list, a linked list, etc. in association with variable $X_2$ level node 204. First variable $X_2$ node 214, second variable $X_2$ node 216, third variable $X_2$ node 218, and fourth variable $X_2$ node 220 may be referred to as first, second, third, and fourth variable two value nodes, respectively.

First variable $X_3$ node 222 and second variable $X_3$ node 224 may be stored in association with variable $X_3$ level node 206. For example, first variable $X_3$ node 222 and second variable $X_3$ node 224 may be stored as an array, as a list, a linked list, etc. in association with variable $X_3$ level node 206. First variable $X_3$ node 222 and second variable $X_3$ node 224 may be referred to as first and second variable three value nodes, respectively.

First variable $X_4$ node 226 and second variable $X_4$ node 228 may be stored in association with variable $X_4$ level node 208. For example, first variable $X_4$ node 226 and second variable $X_4$ node 228 may be stored as an array, as a list, a linked list, etc. in association with variable $X_4$ level node 208. First variable $X_4$ node 226 and second variable $X_4$ node 228 may be referred to as first and second variable four value nodes, respectively.

Each variable value node 210, 212, 214, 216, 218, 220, 222, 224, 226, 228 references a variable value node memory structure that may include a value indicator, a counter value, and an observation indicator. For illustration, first variable $X_1$ node 210 may indicate that the value indicator of $X_1$ for first variable $X_1$ node 210 is zero (V=0); the counter value may indicate that the counter value of $X_1$ for V=0 is four (#4); and the observation indicator may indicate that the remaining variable values for first variable $X_1$ node 210 can be determined by reviewing the observation data in data matrix 124 referenced by the value of the observation indicator. For illustration, the observation indicator may be an index to a row in Table I that stores the observation data, may be a pointer to a memory location that stores the observation data, may be the actual observation data for the observation, etc.

First variable $X_1$ node 210 may be "vertically" linked to root node 201 as illustrated by a first vertical connector 230. Second variable $X_1$ node 212 may be "vertically" linked to root node 201 as illustrated by a second vertical connector 231. First variable $X_1$ node 210 and second variable $X_1$ node 212 may be referenced as child nodes of root node 201. First variable $X_1$ node 210 may be "horizontally" linked to second variable $X_1$ node 212 as illustrated by a first horizontal connector 232.

First variable $X_2$ node 214 may be "vertically" linked to first variable $X_1$ node 210 as illustrated by a third vertical connector 233. Second variable $X_2$ node 216 may be "vertically" linked to first variable $X_1$ node 210 as illustrated by a fourth vertical connector 234. First variable $X_2$ node 214 and second variable $X_2$ node 216 may be referenced as child nodes of first variable $X_1$ node 210. First variable $X_2$ node 214 may be "horizontally" linked to second variable $X_2$ node 216 as illustrated by a second horizontal connector 235. First variable $X_2$ node 214 further may be "horizontally" linked to second variable $X_2$ node 216 as illustrated by a first dashed horizontal connector 236.

Third variable $X_2$ node 218 may be "vertically" linked to second variable $X_1$ node 212 as illustrated by a fifth vertical connector 237. Fourth variable $X_2$ node 220 may be "vertically" linked to second variable $X_1$ node 212 as illustrated by a sixth vertical connector 238. Third variable $X_2$ node 218 and fourth variable $X_2$ node 220 may be referenced as child nodes of second variable $X_1$ node 212. Second variable $X_2$ node 216 may be "horizontally" linked to third variable $X_2$ node 218 as illustrated by a third horizontal connector 239. Third variable $X_2$ node 218 may be "horizontally" linked to fourth variable $X_2$ node 220 as illustrated by a fourth horizontal connector 240. Second variable $X_2$ node 216 further may be "horizontally" linked to fourth variable $X_2$ node 220 as illustrated by a second dashed horizontal connector 241.

First variable $X_3$ node 222 may be "vertically" linked to third variable $X_2$ node 218 as illustrated by a seventh vertical connector 242. Second variable $X_3$ node 224 may be "vertically" linked to third variable $X_2$ node 218 as illustrated by an eighth vertical connector 243. First variable $X_3$ node 222 and second variable $X_3$ node 224 may be referenced as child nodes of third variable $X_2$ node 218. First variable $X_3$ node 222 may be "horizontally" linked to second variable $X_3$ node 224 as illustrated by a fifth horizontal connector 244. First variable $X_3$ node 222 further may be "horizontally" linked to second variable $X_3$ node 224 as illustrated by a third dashed horizontal connector 245.

First variable $X_4$ node 226 may be "vertically" linked to first variable $X_2$ node 214 as illustrated by a ninth vertical connector 246. Second variable $X_4$ node 228 may be "vertically" linked to first variable $X_2$ node 214 as illustrated by a tenth vertical connector 247. First variable $X_4$ node 226 and second variable $X_4$ node 228 may be referenced as child nodes of first variable $X_2$ node 214. First variable $X_4$ node 226 may be "horizontally" linked to second variable $X_4$ node 228 as illustrated by a sixth horizontal connector 248.

First tree data structure 200 visually represents data parameters stored, for example, in computer-readable medium 108. The data parameters may be referred to as tree data 126 and may be stored in computer-readable memory 108 in any manner as understood by a person of skill in the art. As an example, root node 201 may reference a memory location that stores the total number of observations in data matrix 124. Root node 201 further may store data that points to a memory location of first variable $X_1$ node 210 and to a memory location of second variable $X_1$ node 212 illustrated by first vertical connector 230 and by second vertical connector 231, respectively.

Each of variable value nodes 210, 212, 214, 216, 218, 220, 222, 224, 226, 228 may reference a memory location that stores the value indicator, the counter value, the observation indicator, and the child nodes, if any, for the respective node. The child nodes may be stored as an array, as a list, as a linked list, etc. that generally may be referenced as a child node list. For example, first variable $X_1$ node 210 further may store data that points to a memory location of first variable $X_2$ node 214 and to a memory location of second variable $X_2$ node 216 illustrated by third vertical connector 233 and by fourth vertical connector 234, respectively, to define the child node list for first variable $X_1$ node 210.

Variable $X_1$ level node 202 further may store data that points to a memory location of first variable $X_1$ node 210. First variable $X_1$ node 210 further may store data that points to a memory location of second variable $X_1$ node 212 illustrated by first horizontal connector 232 to form a linked list of horizontal connectors from variable $X_1$ level node 202.

Variable $X_2$ level node 204 further may store data that points to a memory location of first variable $X_2$ node 214. First variable $X_2$ node 214 further may store data that points to a memory location of second variable $X_2$ node 216 illustrated by second horizontal connector 235, second variable $X_2$ node 216 further may store data that points to a memory location of third variable $X_2$ node 218 illustrated by third horizontal connector 239, third variable $X_2$ node 218 further may store data that points to a memory location of fourth variable $X_2$ node 220 illustrated by fourth horizontal connector 240 to form a linked list of horizontal connectors from variable $X_2$ level node 204.

Variable $X_2$ level node 204 further may store data that points to a memory location of first variable $X_2$ node 214 for example as a first, variable two level suppressed node. First variable $X_2$ node 214 further may store data that points to a memory location of second variable $X_2$ node 216 illustrated by first dashed horizontal connector 236, second variable $X_2$ node 216 further may store data that points to a memory location of fourth variable $X_2$ node 220 illustrated by second dashed horizontal connector 241 to form a second linked list of horizontal connectors from variable $X_2$ level node 204. Variable $X_2$ level node 204 further may store data that points to a memory location of first variable $X_2$ node 214, of second variable $X_2$ node 216, and of fourth variable $X_2$ node 220 to represent the dashed horizontal connectors. For example, first variable $X_2$ node 214, second variable $X_2$ node 216, and fourth variable $X_2$ node 220 may be stored as a second array, as a second list, as a second linked list, etc. in association with variable $X_2$ level node 204.

No additional nodes are needed to construct a contingency table for any combination of variables selected from data matrix 124 in the illustrative embodiment of Table I. An example contingency table is shown in Table II below for variables $X_1$ and $X_3$.

TABLE II

| Variable $X_1$ | Variable $X_3$ | Frequency |
| --- | --- | --- |
| 0 | 0 | 3 |
| 0 | 1 | 1 |
| 1 | 0 | 2 |
| 1 | 1 | 2 |

Table II includes a first variable of the variable pair (Variable $X_1$) in a first column, a second variable of the variable pair (Variable $X_3$) in a second column, and a frequency counter value in a third column. The frequency counter value indicates a number of times the variable pair combination of values occurs in data matrix 124. Of course, a contingency table may be organized in a different manner.

Referring to FIG. 3, a step in defining first tree data structure 200 is shown in accordance with an illustrative embodiment. A first row of data matrix 124 is read. The first variable $X_1$ node 210 memory location may be defined and the value indicator may be initialized based on the value of variable $X_1$ read from the first row, the counter value may be initialized to one, and the observation indicator may be defined as one to indicate the first observation in data matrix 124. The root node 201 memory location may be defined, and the total number of observations may be initialized to one. The first variable $X_1$ node 210 memory location may be stored in association with the root node 201 memory location to initialize a root node child list. The variable $X_1$ level node 202 memory location may be defined and the first variable $X_1$ node 210 memory location may be stored in association with the variable $X_1$ level node 202 memory location to initialize a variable one level list. The variable $X_1$ level node 202 memory location further may be stored in association with the root node 201 memory location.

Referring to FIG. 4, another step in defining first tree data structure 200 is shown in accordance with an illustrative embodiment. A second row of data matrix 124 is read. The root node 201 memory location may be updated by incrementing the total number of observations counter. The first variable $X_1$ node 210 memory location may be updated by incrementing the counter value based on the value of variable $X_1$ read from the second row matching the value of variable $X_1$ read from the first row. Because the value of variable $X_2$ read from the second row does not match the value of variable $X_2$ read from the first row, first variable $X_2$ node 214 and second variable $X_2$ node 216 memory locations are created as child nodes of first variable $X_1$ node 210. First variable $X_2$ node 214 is initialized to reflect the value V=0 and to indicate the first observation; whereas, second variable $X_2$ node 216 is initialized to reflect the value V=1 and to indicate the second observation.

For example, a first variable $X_2$ node 214 memory location may be defined and the value indicator may be initialized based on the value of variable $X_2$ read from the first row, the counter value may be initialized to one, and the observation indicator may be defined as one to indicate the first observation in data matrix 124. A second variable $X_2$ node 216 memory location may be defined and the value indicator may be initialized based on the value of variable $X_2$ read from the second row, the counter value may be initialized to one, and the observation indicator may be defined as two to indicate the second observation in data matrix 124. The first variable $X_2$ node 214 memory location and the second variable $X_2$ node 216 memory location may be stored in association with the first variable $X_1$ node 210 memory location to initialize a first variable one node child list.

A variable $X_2$ level node 204 memory location may be defined. The first variable $X_2$ node 214 memory location and the second variable $X_2$ node 216 memory location may be stored in association with the variable $X_2$ level node 204 memory location to initialize a variable two level list. The first variable $X_2$ node 214 memory location and the second variable $X_2$ node 216 memory location further may be stored in association with the variable $X_2$ level node 204 memory location to initialize a suppressed variable two level list.

Referring to FIG. 5, still another step in defining first tree data structure 200 is shown in accordance with an illustrative embodiment. A third row of data matrix 124 is read. The root node 201 memory location may be updated by incrementing the total number of observations counter. The first variable $X_1$ node 210 memory location may be updated by incrementing the counter value based on the value of variable $X_1$ read from the third row matching that read from the first row. The first variable $X_2$ node 214 memory location may be updated by incrementing the counter value based on the value of variable $X_2$ read from the third row matching that read from the first row. Because the values of variables $X_2$ and $X_3$ read from the third row of data matrix 124 match the values of variables $X_2$ and $X_3$ read from the first row, but the value of variable $X_4$ read from the third row does not match the value of variable $X_4$ read from the first row, first variable $X_4$ node 226 and second variable $X_4$ node 228 are created as child nodes of first variable $X_2$ node 214. First variable $X_4$ node 226 is initialized to reflect the value V=0 and to point to the first observation; whereas, second variable $X_4$ node 228 is initialized to reflect the value V=1 and to point to the third observation.

For example, a first variable $X_4$ node 226 memory location may be defined and the value indicator may be initialized based on the value of variable $X_4$ read from the first row, the counter value may be initialized to one, and the observation indicator may be defined as one to indicate the first observation in data matrix 124. A second variable $X_4$ node 228 memory location may be defined and the value indicator may be initialized based on the value of variable $X_4$ read from the third row, the counter value may be initialized to one, and the observation indicator may be defined as three to indicate the third observation in data matrix 124. The first variable $X_4$ node 226 memory location and the second variable $X_4$ node 228 memory location may be stored in association with the first variable $X_2$ node 214 memory location to initialize a first variable two node child list.

A variable $X_4$ level node 208 memory location may be defined. The first variable $X_4$ node 226 memory location and the second variable $X_4$ node 228 memory location may be stored in association with the variable $X_4$ level node 208 memory location to initialize a variable four level list.

Figure 6:
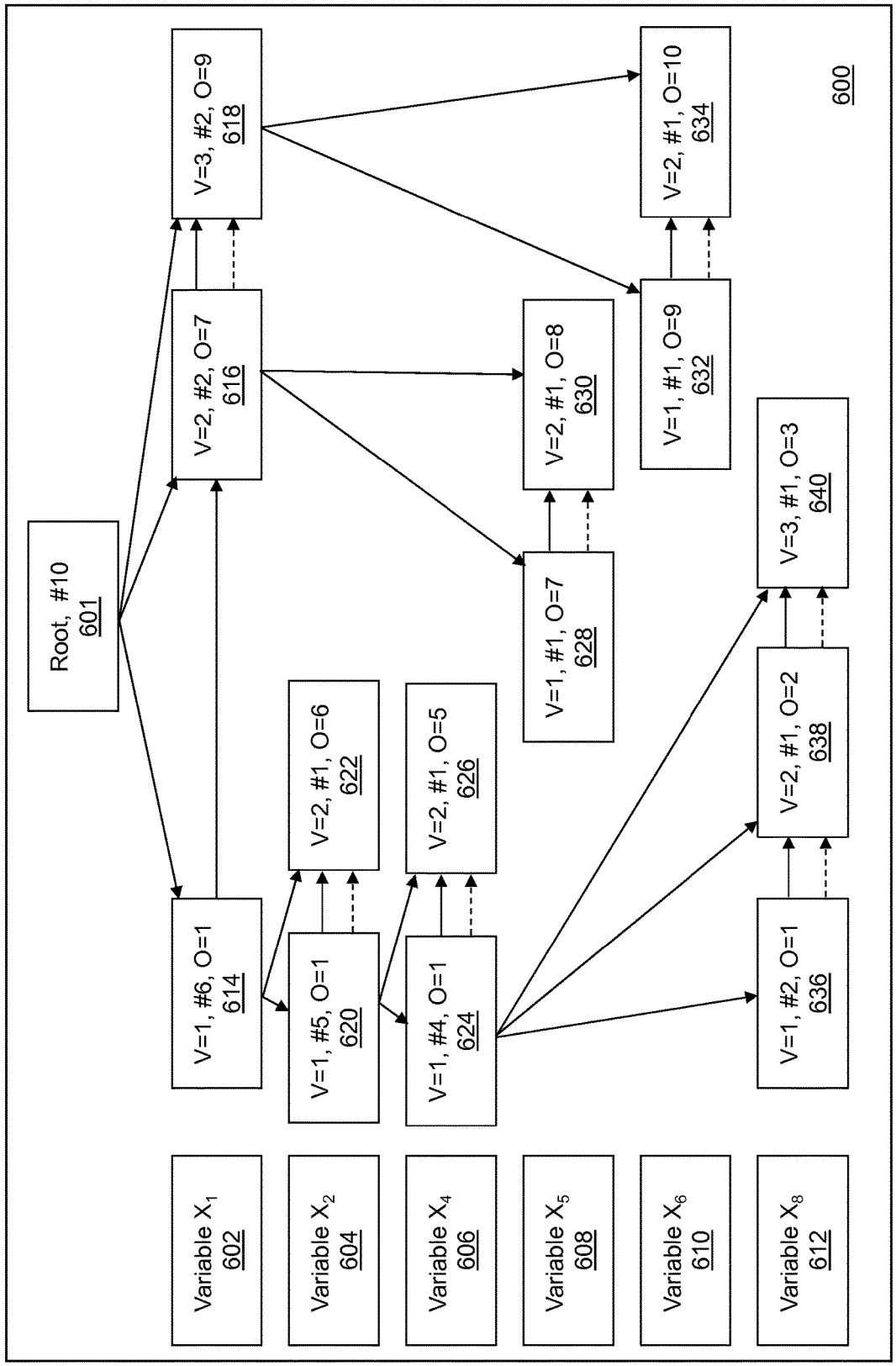
FIG. 6 depicts a second tree data structure in accordance with an illustrative embodiment.

Referring to FIG. 6, a second tree data structure 600 is shown in accordance with an illustrative embodiment. In the illustrative embodiment, second tree data structure 600 was created from data matrix 124 comprised of data shown in Table III below:

TABLE III

| Obs. # | Var. $X_1$ | Var. $X_2$ | Var. $X_3$ | Var. $X_4$ | Var. $X_5$ | Var. $X_6$ | Var. $X_7$ | Var. $X_8$ | Var. $X_9$ | Var. $X_{10}$ |
|---|---|---|---|---|---|---|---|---|---|---|
| 1 | 1 | 1 | 1 | 1 | 2 | 2 | 2 | 1 | 1 | 4 |
| 2 | 1 | 1 | 1 | 1 | 2 | 2 | 2 | 2 | 2 | 3 |
| 3 | 1 | 1 | 1 | 1 | 2 | 2 | 2 | 3 | 3 | 2 |
| 4 | 1 | 1 | 1 | 1 | 2 | 2 | 2 | 1 | 1 | 4 |
| 5 | 1 | 1 | 1 | 2 | 1 | 3 | 1 | 4 | 4 | 1 |
| 6 | 1 | 2 | 1 | 3 | 3 | 1 | 3 | 5 | 5 | 5 |
| 7 | 2 | 3 | 2 | 3 | 1 | 2 | 4 | 1 | 2 | 3 |
| 8 | 2 | 3 | 2 | 3 | 2 | 1 | 3 | 2 | 3 | 4 |
| 9 | 3 | 2 | 3 | 1 | 3 | 1 | 2 | 3 | 4 | 5 |
| 10 | 3 | 2 | 3 | 1 | 3 | 2 | 1 | 4 | 5 | 1 |

In the illustrative embodiment of Table III, data matrix 124 includes ten rows associated with ten observations and ten variables, $X_1$, $X_2$, $X_3$, $X_4$, $X_5$, $X_6$, $X_7$, $X_8$, $X_9$, and $X_{10}$, where each variable has up to five possible values '1', '2', '3', '4', and '5'.

Second tree data structure 600 includes a root node 601, a variable $X_1$ level node 602, a variable $X_2$ level node 604, a variable $X_4$ level node 606, a variable $X_5$ level node 608, a variable $X_6$ level node 610, and a variable $X_8$ level node 612, a first variable $X_1$ node 614, a second variable $X_1$ node 616, a third variable $X_1$ node 618, a first variable $X_2$ node 620, a second variable $X_2$ node 622, a first variable $X_4$ node 624, a second variable $X_4$ node 626, a first variable $X_5$ node 628, a second variable $X_5$ node 630, a first variable $X_6$ node 632, a second variable $X_6$ node 634, a first variable $X_8$ node 636, a second variable $X_8$ node 638, and a third variable $X_8$ node 640. No additional nodes are needed to construct contingency tables for any combination of variables selected from data matrix 124 in the illustrative embodiment of Table III.

Figure 7A:
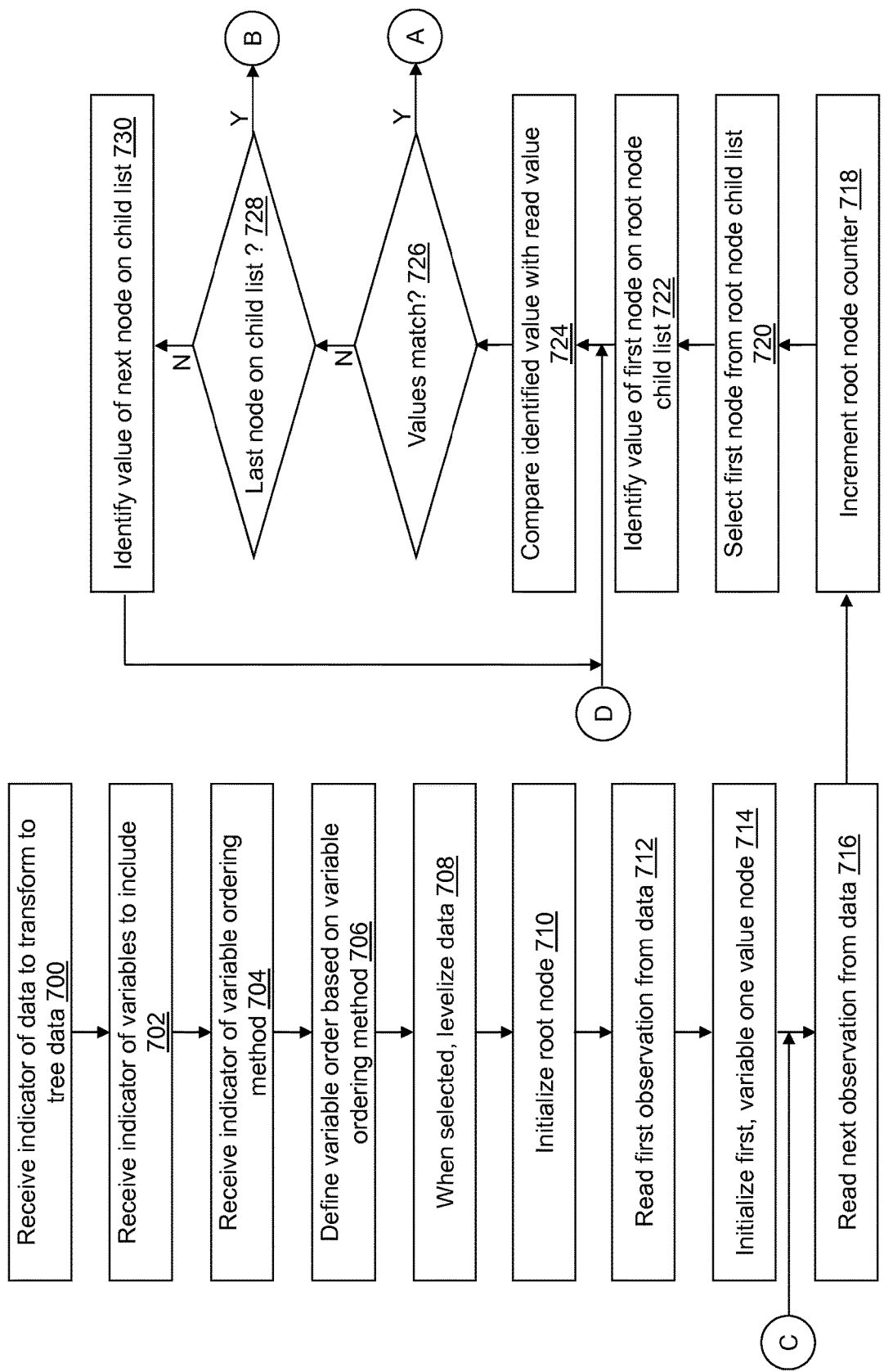
FIGS. 7a-7c depict a flow diagram illustrating examples of operations performed by the data conversion device of FIG. 1 in accordance with an illustrative embodiment.
Figure 7B:
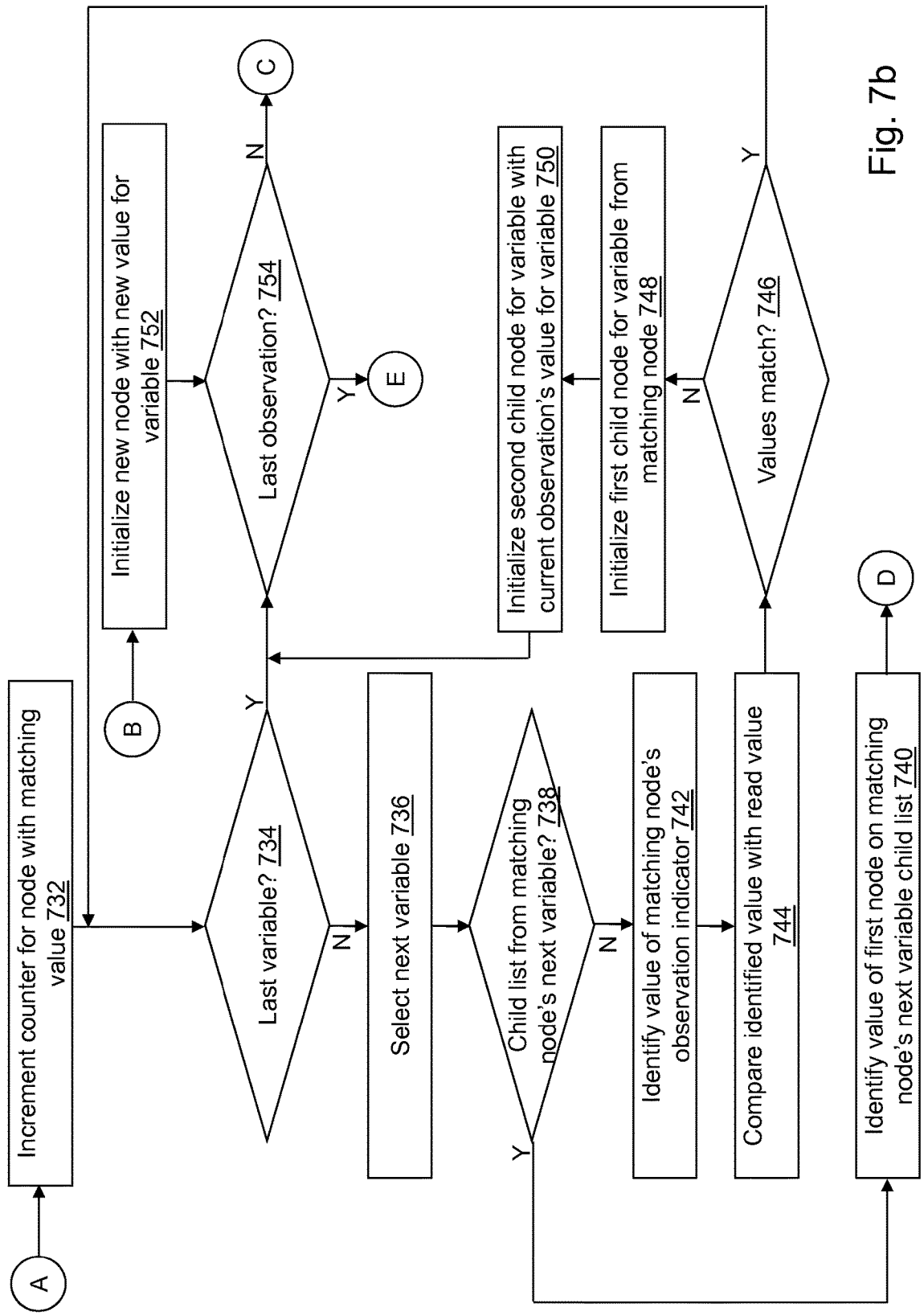
Figure 7C:
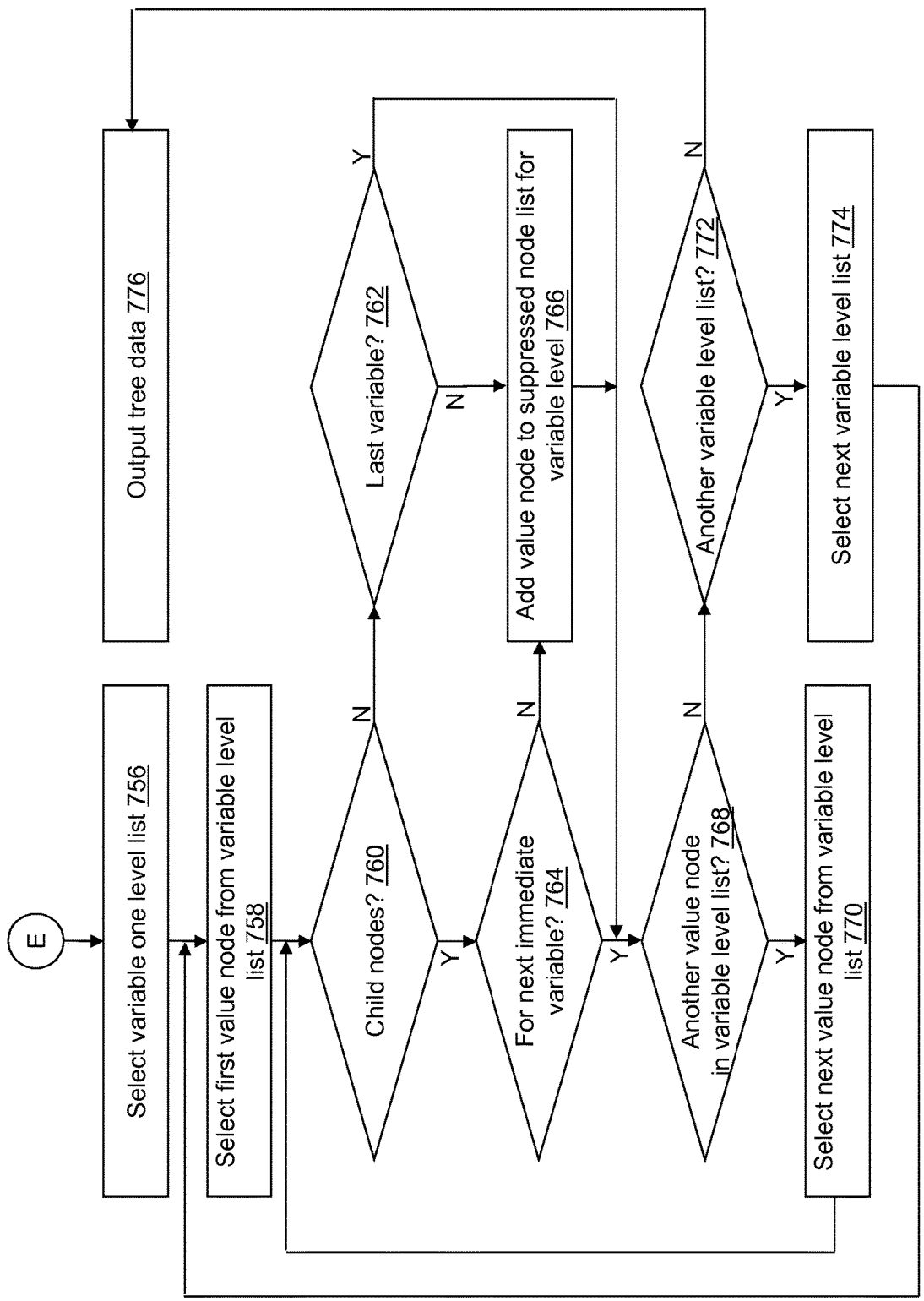

Referring to FIGS. 7a-7c, example operations associated with tree data creation application 122 are described. For example, tree data creation application 122 may be used to create tree data 126 that defines first tree data structure 200 from data matrix 124 that includes the data shown in Table I or that defines second tree data structure 600 from data matrix 124 that includes the data shown in Table III. Tree data 126 is a conversion (not a conversion matrix as in linear algebra) of data matrix 124 that supports an efficient creation of contingency tables based on the data in data matrix 124. Additional, fewer, or different operations may be performed depending on the embodiment. The order of presentation of the operations of FIGS. 7a-7c is not intended to be limiting. Although some of the operational flows are presented in sequence, the various operations may be performed in various repetitions, concurrently (in parallel, for example, using threads), and/or in other orders than those that are illustrated. For example, a user may execute tree data creation application 122, which causes presentation of a first user interface window, which may include a plurality of menus and selectors such as drop down menus, buttons, text boxes, hyperlinks, etc. associated with tree data creation application 122 as understood by a person of skill in the art. An indicator may indicate one or more user selections from a user interface, one or more data entries into a data field of the user interface, one or more data items read from computer-readable medium 108 or otherwise defined with one or more default values, etc. that are received as an input by tree data creation application 122.

Referring to FIG. 7a, in an operation 700, a first indicator of data to convert to tree data 126 is received. For example, the first indicator indicates a location of data matrix 124. As an example, the first indicator may be received by tree data creation application 122 after selection from a user interface window or after entry by a user into a user interface window. In an alternative embodiment, the data to convert may not be selectable. For example, a most recently created data set may be used automatically.

As discussed previously, data matrix 124 may be stored in a cube distributed across a grid of computers, may be stored in a multi-node Hadoop® cluster distributed across one or more computers, may be stored in a file system distributed across one or more computers, in a relational database, in one or more tables, in a structured query language database, etc.

In an operation 702, a second indicator of variables to include in tree data 126 is received. The second indicator may indicate that only a portion of the columns (variables) stored in data matrix 124 be included in tree data 126. In an alternative embodiment, the second indicator may not be received. For example, all of the columns may be used automatically. The second indicator further may indicate a number of observations to include in tree data 126, a percentage of observations of data matrix 124 to include in tree data 126, etc. A subset of the observations may be created from data matrix 124 by sampling. An example sampling algorithm is uniform sampling. Other random sampling algorithms may be used.

In an operation 704, a third indicator of a variable ordering method is received. For example, the third indicator indicates a name of a variable ordering method. The third indicator may be received by tree data creation application 122 after selection from a user interface window or after entry by a user into a user interface window. A default value for the variable ordering method may further be stored, for example, in computer-readable medium 108. As an example, a variable ordering method may be "user-defined", and the user may define the variable priority ordering by listing column numbers in order from highest to lowest or vice versa. In an alternative embodiment, the variable ordering method may not be selectable. The variable ordering may be based on the column number by default with the first column of observation data having a highest or a lowest priority and the last column of observation data having a lowest or a highest priority, respectively. As another example, the variable ordering method may be "stored", and the variable priority ordering may be stored, for example, as a first line in data matrix 124 or in another memory location of computer-readable memory 108. As yet another example, the variable ordering method may be "correlation", and the variable priority ordering may be determined by a user defining a column as a target or a highest priority column and executing a correlation algorithm to calculate a relative importance to the defined target or highest priority column.

The correlation algorithm may further be user definable or selectable or be defined using a default algorithm.

In an operation 706, the variable order is defined based on the variable ordering method defined in operation 704 or by default based on the column number. A rank or order number may be associated with each column number such that the columns are processed based on the rank or order number. The higher ranked or order variables are positioned closer to root node 201 when tree data 126 is defined.

In an operation 708, when selected for levelization by a user, the data in one or more columns of data matrix 124 is levelized. A variable (column of data) may be levelized by mapping the original attribute values to a range of contiguous integer values. Missing attribute values may be assigned a distinct integer value.

In operation 710, a root node is initialized. For example, a memory location for root node 201 may be defined, and the root counter value may be initialized to one and stored in association with the memory location.

In an operation 712, a first observation is read from data matrix 124. For example, a first row stored in Table I is read.

In an operation 714, a first, variable one value node is initialized. The first variable may be selected from the highest ranked column, which may be the first column in data matrix 124. For example, the first variable $X_1$ node 210 may be the first, variable one value node. The first variable $X_1$ node 210 memory location may be defined, the $X_1$ value may be initialized to zero based on the value of variable $X_1$ stored in the first row, the counter value may be initialized to one, and the observation indicator may be initialized to one. The $X_1$ value, the counter value, and the observation indicator may be stored in association with the first variable $X_1$ node 210 memory location. The first variable $X_1$ node 210 memory location may be stored in association with the root node 201 memory location to initialize a root node child list. The first variable $X_1$ node 210 memory location further may be stored in association with the variable $X_1$ level node 202 memory location to initialize a variable one level list. The variable $X_1$ level node 202 memory location may be defined any time prior to storing first variable $X_1$ node 210 memory location in association with the variable $X_1$ level node 202 memory location.

In an operation 716, a next observation is read from data matrix 124. The next observation read becomes a current observation. For example, a second row stored in Table I is read and becomes the current observation. In an operation 718, the root counter value associated with the root node 201 memory location is incremented.

In an operation 720, a first node is selected from the root node child list. For example, the first variable $X_1$ node 210 memory location is selected.

In an operation 722, a value of the value indicator of the first node on the root node child list is identified. For example, the $X_1$ value stored in association with the first variable $X_1$ node 210 memory location is identified.

In an operation 724, the identified value is compared to the value of the corresponding variable of the current observation. For example, the value of variable $X_1$ of the current observation is compared to the $X_1$ value stored in association with the first variable $X_1$ node 210 memory location.

In an operation 726, a determination is made concerning whether or not the values match. When the values do not match, processing continues in an operation 728. When the values match, processing continues in an operation 732.

In operation 728, a determination is made concerning whether or not the node currently being processed is the last node on the child list. When the node currently being processed is not the last node on the child list, processing continues in an operation 730. When the node currently being processed is the last node on the child list, processing continues in an operation 752. For example, when the first variable $X_1$ node 210 memory location is the last node in the root node child list, processing continues in operation 752. When the first variable $X_1$ node 210 memory location is not the last node in the root node child list, processing continues in operation 730.

In operation 730, a value of the value indicator of a next node on the child list is identified. For example, the $X_1$ value stored in association with the second variable $X_1$ node 212 memory location is identified. Processing continues in operation 724 to compare the value of the current observation to the value identified in operation 730.

Referring to FIG. 7b, in an operation 732, the counter value of the matching node is incremented. For example, when processing the second observation in Table I, the counter value associated with first variable $X_1$ node 210 is incremented because the variable $X_1$ values match.

In operation 734, a determination is made concerning whether or not the variable currently being processed is the last variable defined in operation 706. For example, whether or not all of the variable levels have been evaluated for matches. When the variable currently being processed is the last variable, processing continues in operation 754 to process a next observation, if any. When the observation matches the values for all variables, the observation is absorbed in the tree data structure with the counter incremented for all of the value nodes that match. When the variable currently being processed is not the last variable, processing continues in an operation 736 to evaluate the next variable.

In operation 736, a next variable to process is selected based on the defined variable order. The next variable becomes the variable currently being processed.

In operation 738, a determination is made concerning whether or not there is a node child list from the current variable for the matching node from operation 726. When there is a node child list from the matching node, processing continues in operation 740. When there is not a node child list from the matching node, processing continues in an operation 742.

In operation 740, a value of the value indicator of a first node on the node child list from the current variable for the matching node is identified. Processing continues in operation 724 to compare the value of the current observation to the value identified in operation 740.

In an operation 742, a value of the value indicator of the current variable of the matching node's observation indicator is identified. For example, the $X_2$ value of observation one is identified when the matching node in operation 726 is first variable $X_1$ node 210 because the observation indicator of first variable $X_1$ node 210 is one. As another example, the $X_2$ value of observation five is identified when the matching node in operation 726 is second variable $X_1$ node 212 because the observation indicator of second variable $X_1$ node 212 is five.

In an operation 744, the value identified in operation 742 is compared to the value of the variable currently being processed of the current observation. For example, the value of variable $X_2$ of the current observation is compared to the $X_2$ value of observation one when the matching node in operation 726 is first variable $X_1$ node 210. As another example, the value of variable $X_2$ of the current observation is compared to the $X_2$ value of observation five when the matching node in operation 726 is second variable $X_1$ node 212.

In an operation 746, a determination is made concerning whether or not the values match. When the values do not match, processing continues in an operation 748. When the values match, processing continues in an operation 734 to evaluate a next variable, if any.

In operation 748, a first child node is initialized for the variable currently being processed. The value indicator of the first child node is defined as the value of the variable defined from the matching node identified in operation 726. For example, when processing observation two of Table I, the first variable $X_2$ node 214 memory location may be defined. The $X_2$ value of the fourth memory location may be initialized to zero based on the value of variable $X_2$ stored for observation one because the observation indicator stored for the matching node, first variable $X_2$ node 210, is one. The counter value of the first variable $X_2$ node 214 memory location may be initialized to one, and the observation indicator of the first variable $X_2$ node 214 memory location may be initialized to one to indicate the first row in Table I. The $X_2$ value, the counter value, and the observation indicator may be stored in association with the first variable $X_2$ node 214 memory location. The first variable $X_2$ node 214 memory location may be stored in association with the first variable $X_1$ node 210 memory location to define a first child node as a first link in a node child list from first variable $X_1$ node 210. The first variable $X_2$ node 214 memory location further may be stored in association with the variable $X_2$ level node 204 memory location, for example, to define a first link in a variable two level list. The variable $X_2$ level node 204 memory location may be defined any time prior to storing the first variable $X_2$ node 214 memory location in association with the variable $X_2$ level node 204 memory location.

In operation 750, a second child node is initialized for the variable currently being processed. The value indicator of the second child node is defined as the value of the variable defined from the current observation. For example, when processing observation two of Table I, a second variable $X_2$ node 216 memory location may be defined. The $X_2$ value of the second variable $X_2$ node 216 memory location may be initialized to one based on the value of variable $X_2$ stored for the current observation. The counter value of the second variable $X_2$ node 216 memory location may be initialized to one, and the observation indicator of the second variable $X_2$ node 216 memory location may be initialized to a row number for the current observation. The $X_2$ value, the counter value, and the observation indicator may be stored in association with the second variable $X_2$ node 216 memory location. The second variable $X_2$ node 216 memory location may be stored in association with the first variable $X_1$ node 210 memory location to define a second child node as a second link in the node child list from first variable $X_1$ node 210. The second variable $X_2$ node 216 memory location further may be stored in association with the variable $X_2$ level node 204 memory location, for example, to define a second link in the variable two level list. For example, referring to FIG. 2, the variable two level list may be illustrated by second horizontal connector 235, third horizontal connector 239, and fourth horizontal connector 240 that connect the nodes 214, 216, 218, and 220 of variable $X_2$ level node 204.

Processing continues in operation 754 to process a next observation, if any. After processing the observations stored in Table I, root node 201, variable $X_1$ level node 202, variable $X_2$ level node 204, variable $X_3$ level node 206, variable $X_4$ level node 208, first variable $X_1$ node 210, second variable $X_1$ node 212, first variable $X_2$ node 214, second variable $X_2$ node 216, third variable $X_2$ node 218, fourth variable $X_2$ node 220, first variable $X_3$ node 222, second variable $X_3$ node 224, first variable $X_4$ node 226, and second variable $X_4$ node 228 of first tree data structure 200 have been defined. The vertical connectors have been defined through the node child lists created between nodes at the different variable levels. The horizontal connectors have been defined through the variable level lists created between nodes at the same variable level.

In operation 752, a new node is initialized with a new value for the variable. For example, when the observation has a different value for the variable than previously included in the variable level list, a new leaf node is added to the variable level list with a pointer pointing to the observation. The new leaf node is the deepest node in the corresponding tree data structure such that the values for the variables from root node 201 to the previous variable match the observation. For example, when processing observation five of Table I, a second variable $X_1$ node 212 memory location may be defined, the $X_1$ value may be initialized to one based on the value of variable $X_1$ stored in the fifth row, the counter value may be initialized to one, and the observation indicator may be initialized to five to indicate the fifth row in Table I. The $X_1$ value, the counter value, and the observation indicator may be stored in association with the second variable $X_1$ node 212 memory location. The second variable $X_1$ node 212 memory location may be stored in association with the root node 201 memory location to define another node in the root node child list. The third second variable $X_1$ node 212 memory location further may be stored in association with the first variable level memory location defined for variable $X_1$ level node 202, for example, to define another node in the variable one level list.

In an operation 754, a determination is made concerning whether or not the observation is the last observation in data matrix 124. When the observation is the last observation in data matrix 124, processing continues in an operation 756. When the observation is not the last observation in data matrix 124, processing continues in operation 716 to process the next observation.

Referring to FIG. 7c, a suppressed node list, if any, is defined for the variable levels such as variable $X_1$ level node 602, variable $X_2$ level node 604, variable $X_4$ level node 606, variable $X_5$ level node 608, variable $X_6$ level node 610, and variable $X_8$ level node 612.

In operation 756, a variable one level list is selected. For example, referring to FIG. 6, the variable one level list that includes first variable $X_1$ node 614, second variable $X_1$ node 616, and third variable $X_1$ node 618 is selected.

Referring again to FIG. 7c, in an operation 758, a first value node from the selected variable level list is selected. For example, referring to FIG. 6, first variable $X_1$ node 614 is selected when the variable one level list is selected. As another example, first variable $X_2$ node 620 is selected when the variable two level list is selected.

Referring again to FIG. 7c, in an operation 760, a determination is made concerning whether or not there is a node child list from the current value node. When there is not a node child list from the current value node, processing continues in an operation 762. When there is a node child list from the current value node, processing continues in operation 764.

In operation 762, a determination is made concerning whether or not the variable level currently being processed is the last variable defined in operation 706, such that all of the variable levels have been evaluated. When the variable currently being processed is the last variable, processing continues in an operation 768 to process a next value node in the variable level list, if any. When the variable currently being processed is not the last variable, processing continues in an operation 766.

In operation 764, a determination is made concerning whether or not the node child list from the current value node is for the next immediate variable from the variable level currently being processed. When the node child list from the current value node is for the next immediate variable from the variable level currently being processed, processing continues in operation 768 to process a next value node in the variable level list, if any. When the node child list from the current value node is not for the next immediate variable from the variable level currently being processed, processing continues in operation 766.

In operation 766, the current value node is added to a suppressed node list for the variable level currently being processed. A node is suppressed either below the current value node or between the current value node and nodes on the node child list.

In operation 768, a determination is made concerning whether or not the variable level list includes another value node. When the variable level list includes another value node, processing continues in an operation 770 to process a next value node in the variable level list, if any. When the variable level list does not include another value node, processing continues in an operation 772.

In operation 770, a next value node from the selected variable level list is selected, and processing continues in operation 760 to process the next value node as the current value node. For example, referring to FIG. 6, second variable $X_1$ node 616 is selected when the variable one level list is selected. As another example, second variable $X_2$ node 622 is selected when the variable two level list is selected.

Referring again to FIG. 7c, in operation 772, a determination is made concerning whether or not there is another variable level list. When there is another variable level list, processing continues in an operation 774. When there is not another variable level list, processing continues in an operation 776. For example, referring to FIG. 6, a variable one level suppressed node list includes second variable $X_1$ node 616 and third variable $X_1$ node 618 because the child lists from each is not defined for the next immediate variable level, which is the variable $X_2$ level. As another example, a variable four level suppressed node list includes first variable $X_5$ node 628 and second variable $X_5$ node 630 because there is no child list from each node and variable $X_5$ is not the last variable. As yet another example, a variable six level suppressed node list includes first variable $X_5$ node 636, second variable $X_5$ node 638, and third variable $X_5$ node 640 because there is no child list from each node and variable $X_5$ is not the last variable. $X_{10}$ is the last variable.

Referring again to FIG. 7c, in operation 774, a next variable level list is selected, and processing continues in operation 758 to process the next variable level list as the current variable level list. For example, referring to FIG. 6, first variable $X_2$ node 620 and second variable $X_2$ node 622 are selected after processing the variable one level list; first variable $X_4$ node 624 and second variable $X_4$ node 626 are selected after processing the variable two level list; first variable $X_5$ node 628 and second variable $X_5$ node 630 are selected after processing the variable four level list; first variable $X_6$ node 632 and second variable $X_6$ node 634 are selected after processing the variable five level list; and first variable $X_8$ node 636, second variable $X_8$ node 638, and third variable $X_8$ node 640 are selected after processing the variable six level list.

In operation 776, tree data 126, which may include the data defining each variable level node, the data defining each variable value node, the observation data associated with the observations referenced by the observation indicator defined for each variable value node, the variable level lists, and the suppressed node list(s), may be output by storing on one or more devices and/or on computer-readable medium 108 in a variety of formats as understood by a person of skill in the art. For example, tree data 126 may be stored in a cache type memory. An amount of memory used to store tree data 126 does not depend on the number of variables. A table of observations may be created that includes the observations referenced by the observation indicator defined for each node in the created tree data 126 instead of using data matrix 124. When the table of observations is created, the observation indicator associated with each variable value node in tree data 126 may be updated to reflect the index into the table of observations.

Figure 8:
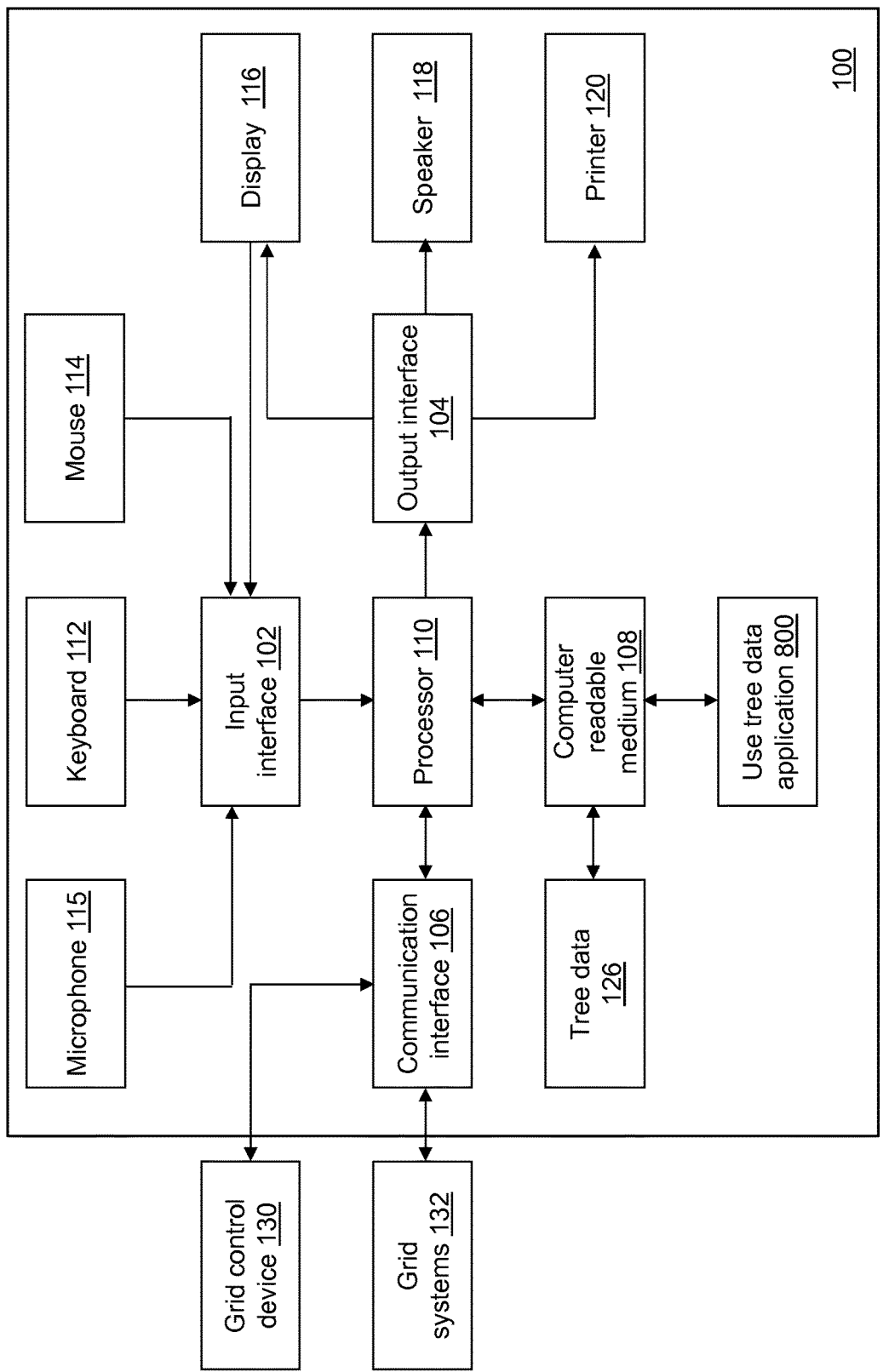
FIG. 8 depicts a second block diagram of the data conversion device of FIG. 1 in accordance with an illustrative embodiment.

Referring to FIG. 8, data conversion device 100 further may include a use tree data application 800. Use tree data application 800 performs operations associated with using tree data 126 created from data matrix 124. For example, use tree data application 800 may create one or more contingency tables for one or more variable pairs. Some or all of the operations described herein may be embodied in use tree data application 800. Tree data creation application 122 and use tree data application 800 may be integrated into a single application, may be separate applications, or tree data creation application 122 and use tree data application 800 may be integrated at other levels than those illustrated.

The operations of use tree data application 800 may be implemented using hardware, firmware, software, or any combination of these methods. Referring to the example embodiment of FIG. 8, use tree data application 800 is implemented in software (comprised of computer-readable and/or computer-executable instructions) stored in computer-readable medium 108 and accessible by processor 110 for execution of the instructions that embody the operations of use tree data application 800. Use tree data application 800 may be written using one or more programming languages, assembly languages, scripting languages, etc. Use tree data application 800 may be implemented as a Web application.

Figure 9A:
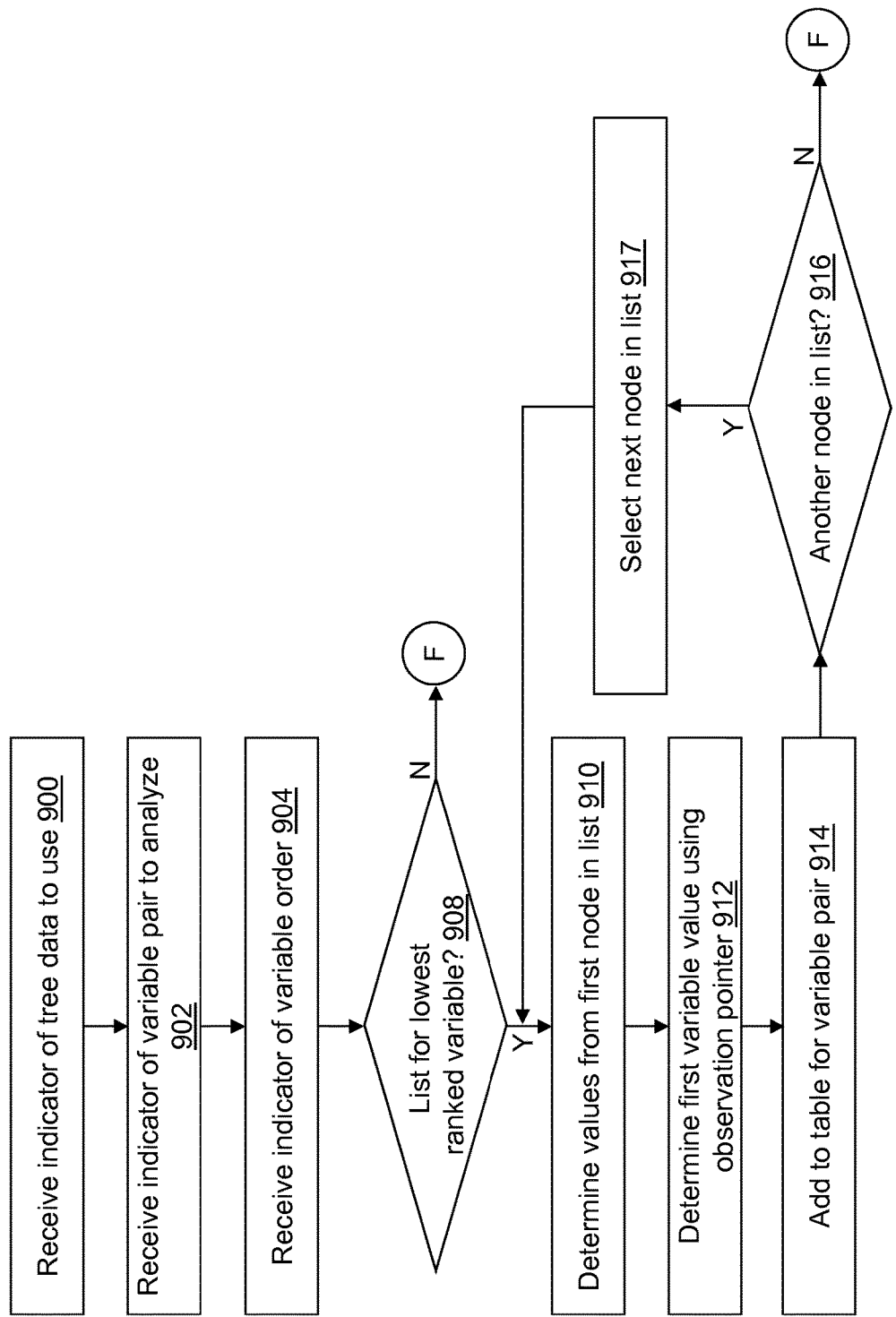
Figure 9B:
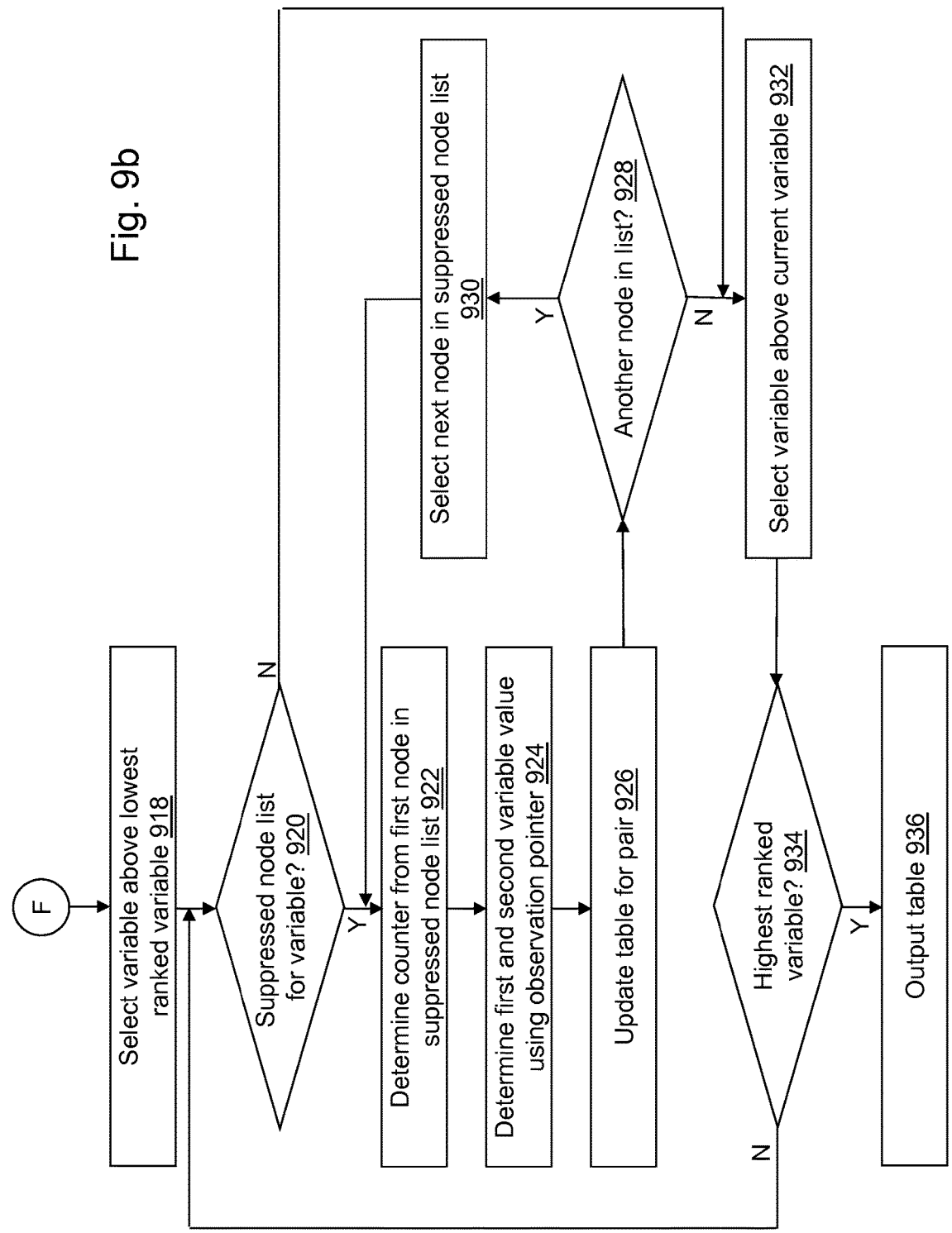

Referring to FIGS. 9a-9b, example operations associated with use tree data application 800 are described. FIGS. 9a-9b include example operations associated with creating a contingency table for a variable pair. Additional, fewer, or different operations may be performed depending on the embodiment. The order of presentation of the operations of FIGS. 9a-9b is not intended to be limiting. Although some of the operational flows are presented in sequence, the various operations may be performed in various repetitions, concurrently (in parallel, for example, using threads), and/or in other orders than those that are illustrated.

Referring to FIG. 9a, in an operation 900, a fourth indicator of tree data 126 to use is received. For example, the fourth indicator indicates a location of tree data 126. As an example, the fourth indicator may be received by use tree data application 800 after selection from a user interface window or after entry by a user into a user interface window. In an alternative embodiment, tree data 126 may not be selectable. For example, a most recently created tree data 126 may be used automatically.

Tree data 126 may be stored in a cube distributed across a grid of computers, may be stored in a multi-node Hadoop® cluster distributed across one or more computers, may be stored in a file system distributed across one or more computers, in a relational database, in one or more tables, in a structured query language database, etc.

In an operation 902, a fifth indicator of a variable pair for which to create a contingency table is received. For example, the fifth indicator may indicate a column number for each variable of the variable pair.

In an operation 904, a sixth indicator of a variable order is received. For example, the sixth indicator indicates the variable order defined in operation 706. As an example, the variable order may be received by reading a memory location of computer-readable memory 108. In an alternative embodiment, the variable order may not be received. The variable order may be based on the column number by default with the first column of observation data having a highest or a lowest priority and the last column of observation data having a lowest or a highest priority, respectively. A highest ranked variable of the variable pair can be referred to as a first variable in the variable pair, and the lowest ranked variable can be referred to as a second variable in the variable pair where the rank is determined based on the received variable order.

Referring again to FIG. 9a, in an operation 908, a determination is made concerning whether or not a variable level list, such as that illustrated by second horizontal connector 235, third horizontal connector 239, and fourth horizontal connector 240 that connect the nodes of variable $X_2$ level node 204, is defined for the second variable of the variable pair. When a variable level list is defined, processing continues in an operation 910. When a variable level list is not defined, processing continues in an operation 918 to process the suppressed node list(s), if any.

In operation 910, the value indicator, the counter value, and the observation indicator are determined from a first node in the variable level list. The value indicator indicates a value of the second variable in the variable pair.

In an operation 912, a value of the first variable in the variable pair is determined using the observation indicator to select the value from a column of data matrix 124 or the created table of observations that stores the values for the first variable.

In an operation 914, the values of the first variable and the second variable and the counter value are added to a contingency table for the variable pair. For example, the contingency table is initialized with three columns, a first column that includes values for the first variable, a second column that includes values for the second variable, and a third column that includes values for a frequency counter for the associated first variable and second variable pair. A first value row includes the value of the first variable in the variable pair in the first column, the value of the second variable in the variable pair in the second column, and the counter value in the third column.

In an operation 916, a determination is made concerning whether or not the variable level list includes another node. When the variable level list includes another node, processing continues in an operation 917 to add another row to the contingency table. When the variable level list does not include another node, processing continues in operation 918 to process the suppressed node list(s), if any.

In operation 917, a next node is selected from the variable level list as the first node, and processing continues in operation 910 to update the contingency table with information from the next node.

Referring to FIG. 9b, the contingency table created for the variable pair is updated based on any suppressed node list(s). In operation 918, a variable above the second variable is selected. For example, the next highest ranked variable is selected. Referring to FIG. 2, when the variable pair is variable $X_1$ and variable $X_4$, variable $X_3$ is selected. The variable above is a next higher ranking variable in tree data 126.

Referring again to FIG. 9b, in operation 920, a determination is made concerning whether or not a suppressed node list is defined for the selected variable. For example, a determination is made concerning whether or not a dashed horizontal connector is defined for the variable level, such as first dashed horizontal connector 236. When a suppressed node list is defined for the selected variable, processing continues in an operation 922. When a suppressed node list is not defined for the selected variable, processing continues in operation 932 to select a next variable above the currently selected variable.

In operation 922, the counter value and the observation indicator are determined from a first node in the suppressed node list. In an operation 924, a value of the first variable and the second variable is determined using the observation indicator determined in operation 922.

In an operation 926, the contingency table is updated to add a new row that includes the value of the first variable, the value of the second variable, and the value of the counter value determined from operation 922 when the pair of variable values does not exist in the contingency table, or the contingency table is updated to add the value of the counter value to the frequency counter value of an existing row already defined for the values of the first variable and the second variable.

In an operation 928, a determination is made concerning whether or not the suppressed node list includes another node. When the suppressed node list includes another node, processing continues in an operation 930. When the suppressed node list does not include another node, processing continues in operation 932 to select a next variable above the current variable.

In operation 930, a next node is selected from the suppressed node list as the first node, and processing continues in operation 922 to update the contingency table with information from the next node.

In operation 932, a variable above the current selected variable is selected, and processing continues in operation 934.

In operation 934, a determination is made concerning whether or not the selected variable is the highest ranked variable. When the selected variable is the highest ranked variable, processing continues in an operation 936. When the selected variable is not the highest ranked variable, processing continues in operation 920 to update the contingency table with information from a suppressed node list, if any, of the newly selected variable.

In operation 936, creation of the contingency table is complete and the table is output, for example, to computer-readable medium 108, to display 116, to printer 120, etc. Ordering the variables in tree data 126 in a defined rank order improves contingency table generation by reducing a traversal of tree data 126 at the lower levels.

Figure 9D:
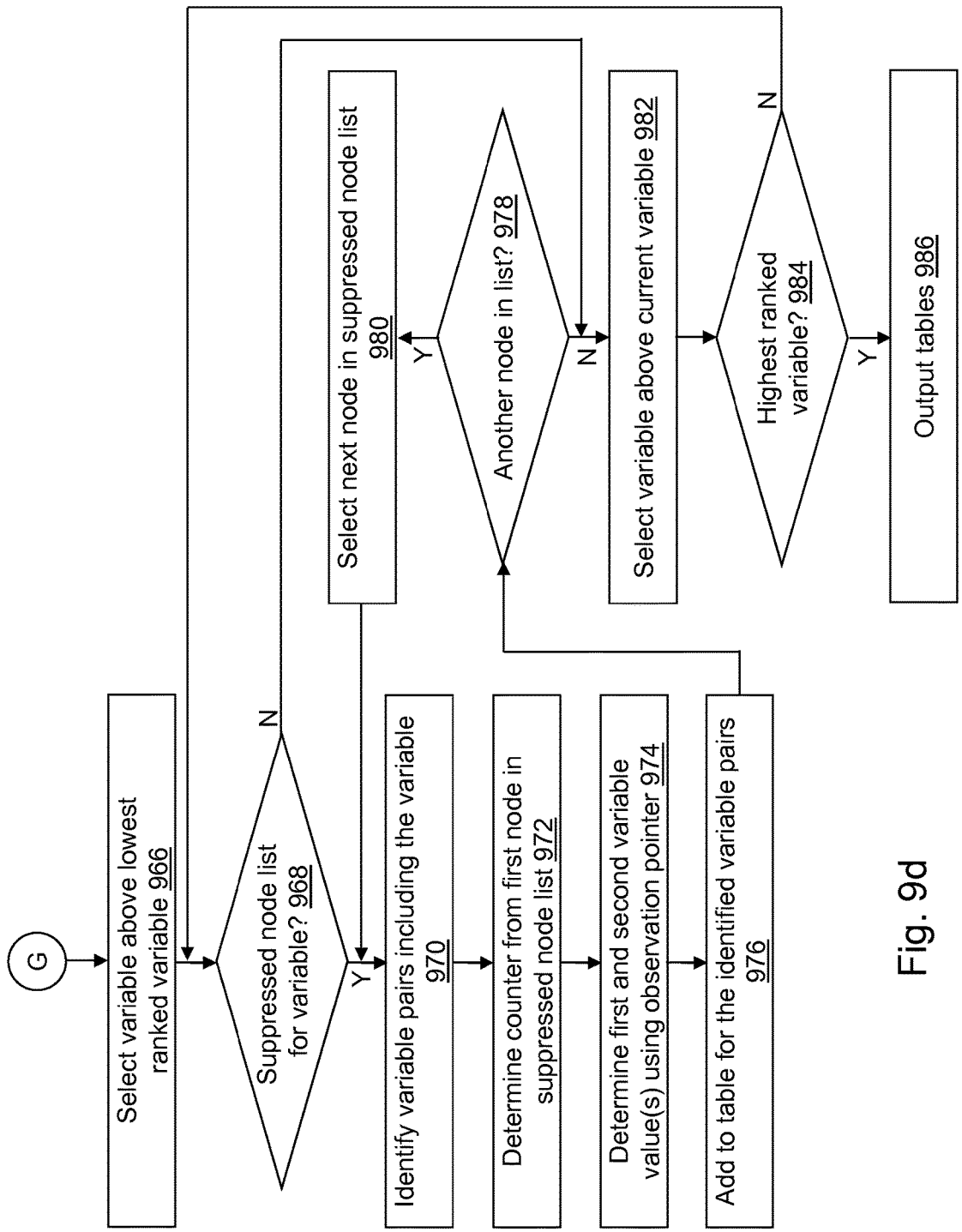

Referring to FIGS. 9c-9d, example operations associated with use tree data application 800 are described for simultaneously creating contingency tables for a plurality of variable pairs. Additional, fewer, or different operations may be performed depending on the embodiment. The order of presentation of the operations of FIGS. 9c-9d is not intended to be limiting. Although some of the operational flows are presented in sequence, the various operations may be performed in various repetitions, concurrently (in parallel, for example, using threads), and/or in other orders than those that are illustrated.

Referring to FIG. 9c, similar to operation 900, in an operation 940, the fourth indicator of tree data 126 to use is received. In an operation 942, a seventh indicator of a plurality of variable pairs is received. A contingency table may be created for each of the plurality of variable pairs. For example, the seventh indicator may indicate a number of the plurality of variable pairs and a pair of column numbers for each pair of the plurality of variable pairs.

Similar to operation 904, in an operation 944, the sixth indicator of the variable order is received. In an operation 946, a unique lowest ranked variable set is defined for the plurality of variable pairs. Again, a highest ranked variable of each variable pair can be referred to as a first variable in the variable pair, and a lowest ranked variable of each variable pair can be referred to as a second variable in the variable pair where the rank is determined based on the received variable order. The lowest ranked variable is evaluated for each of the plurality of variable pairs and added to the set if the variable has not already been included in the set.

In an operation 948, a first lowest ranked variable is selected from the unique lowest ranked variable set.

In an operation 950, a determination is made concerning whether or not a variable level list, such as that illustrated by second horizontal connector 235, third horizontal connector 239, and fourth horizontal connector 240 that connect the nodes of variable $X_2$ level node 204, is defined for the selected first lowest ranked variable. When a variable level list is defined for the selected first lowest ranked variable, processing continues in an operation 952. When a variable level list is not defined for the selected first lowest ranked variable, processing continues in an operation 962 to process a next variable selected from the unique lowest ranked variable set, if any.

In operation 952, one or more variable pairs of the plurality of variable pairs are identified that include the first lowest ranked variable as the second variable in the variable pair. The first variable may be different for one or more of the identified one or more variable pairs.

Similar to operation 910, in an operation 953, the value indicator, the counter value, and the observation indicator are determined from a first node in the variable level list. The value indicator indicates a value of the first lowest ranked variable.

Similar to operation 912, in an operation 954, a value of the first variable for each of the identified one or more variable pairs is determined using the observation indicator to select the value from a column of data matrix 124 or the created table of observations that stores the values for the first variable.

Similar to operation 914, in an operation 956, the values of the first variable and the second variable and the counter value are added to a contingency table for each of the identified one or more variable pairs.

Similar to operation 916, in an operation 958, a determination is made concerning whether or not the variable level list includes another node. When the variable level list includes another node, processing continues in an operation 960 to add another row to the contingency table. When the variable level list does not include another node, processing continues in operation 962 to process a next variable selected from the unique lowest ranked variable set, if any.

In operation 960, a next node is selected from the variable level list as the first node, and processing continues in operation 952 to update the contingency table(s) with information from the next node.

In an operation 962, a determination is made concerning whether or not the unique lowest ranked variable set includes another lowest ranked variable. When the unique lowest ranked variable set includes another lowest ranked variable, processing continues in an operation 963 to update the contingency table(s) based on the next variable. When the unique lowest ranked variable set does not include another lowest ranked variable, processing continues in an operation 964.

In operation 963, a next lowest ranked variable is selected from the unique lowest ranked variable set as the first variable, and processing continues in operation 950 to update the contingency table(s) with information from the next variable.

In operation 964, a lowest ranked variable is selected from the unique lowest ranked variable set as the lowest ranked variable of any of the plurality of variable pairs.

Referring to FIG. 9d, the contingency tables created for the plurality of variable pairs are updated based on any suppressed node lists. Similar to operation 918, in an operation 966, a variable above the selected lowest ranked variable is selected.

Similar to operation 920, in operation 968, a determination is made concerning whether or not a suppressed node list is defined for the selected variable. When a suppressed node list is defined for the selected variable, processing continues in an operation 970. When a suppressed node list is not defined for the selected variable, processing continues in operation 982 to select a next variable above the currently selected variable.

In operation 970, one or more variable pairs of the plurality of variable pairs are identified that include the selected variable as the second variable in the variable pair. The first variable may be different for one or more of the identified one or more variable pairs.

Similar to operation 922, in an operation 972, the counter value and the observation indicator are determined from a first node in the suppressed node list. In an operation 974, a value of the first variable and of the second variable for each of the identified one or more variable pairs is determined using the observation indicator.

In an operation 976, the contingency table for each of the identified one or more variable pairs is updated to add a new row that includes the value of the first variable, the value of the second variable, and the value of the counter value when the pair of variable values does not exist in the contingency table, or the contingency table is updated to add the value of the counter value to the frequency counter value of an existing row already defined for the values of the first variable and the second variable.

Similar to operation 928, in an operation 978, a determination is made concerning whether or not the suppressed node list includes another node. When the suppressed node list includes another node, processing continues in an operation 980. When the suppressed node list does not include another node, processing continues in operation 982 to select a next variable above the currently selected variable.

Similar to operation 930, in operation 980, a next node is selected from the suppressed node list as the first node, and processing continues in operation 970 to update the contingency table(s) with information from the next node.

Similar to operation 932, in operation 982, a variable above the currently selected variable is selected, and processing continues in operation 984.

Similar to operation 934, in an operation 984, a determination is made concerning whether or not the selected variable is the highest ranked variable. When the selected variable is the highest ranked variable, processing continues in an operation 986. When the selected variable is not the highest ranked variable, processing continues in operation 968 to update the contingency tables with information from the suppressed node list, if any, of the newly selected variable.

Similar to operation 936, in operation 986, creation of the contingency tables is complete and the tables are output, for example, to computer-readable medium 108, to display 116, to printer 120, etc. Ordering the variables in tree data 126 in a defined rank order improves contingency table generation by reducing a traversal of tree data 126 at the lower levels.

If data conversion device 100 is multi-threaded, the operations of FIGS. 7a-7c and FIGS. 9a-9d may be performed in parallel. If data matrix 124 and/or tree data 126 is distributed across one or more other devices, a distributed processing system can be used. For example, referring to FIG. 10, a block diagram of a distributed processing system 1000 is shown in accordance with an illustrative embodiment. In an illustrative embodiment, distributed processing system 1000 may include grid systems 132, data conversion systems 1002, grid control device 130, and a network 1001. For illustration, grid control device 130 and grid systems 132 may be implemented as a multi-node Hadoop® cluster, as understood by a person of skill in the art. As another illustration, grid systems 132 may store a cube of data. Data conversion systems 1002 access data stored in the cube of data distributed to the grid systems 132. Grid control device 130 coordinates and controls access by data conversion systems 1002 to the data stored by the grid systems 132. One or more components of distributed processing system 1000 may support multithreading, as understood by a person of skill in the art.

The components of distributed processing system 1000 may be located in a single room or adjacent rooms, in a single facility, and/or may be distributed geographically from one another. Each of grid systems 132, data conversion systems 1002, and grid control device 130 may be composed of one or more discrete devices.

Network 1001 may include one or more networks of the same or different types. Network 1001 can be any type of wired and/or wireless public or private network including a cellular network, a local area network, a wide area network such as the Internet, etc. Network 1001 further may comprise sub-networks and consist of any number of devices.

Data conversion systems 1002 can include any number and type of computing devices that may be organized into subnets. Data conversion device 100 is an example computing device of data conversion systems 1002. The computing devices of data conversion systems 1002 send and receive communications through network 1001 to/from another of the one or more computing devices of data conversion systems 1002, to/from grid systems 132, and/or to/from grid control device 130. The one or more computing devices of data conversion systems 1002 may include computers of any form factor such as a laptop 1008, a desktop 1006, a smart phone 1004, a personal digital assistant, an integrated messaging device, a tablet computer, etc. The one or more computing devices of data conversion systems 1002 may communicate using various transmission media that may be wired and/or wireless as understood by those skilled in the art.

Figure 10:
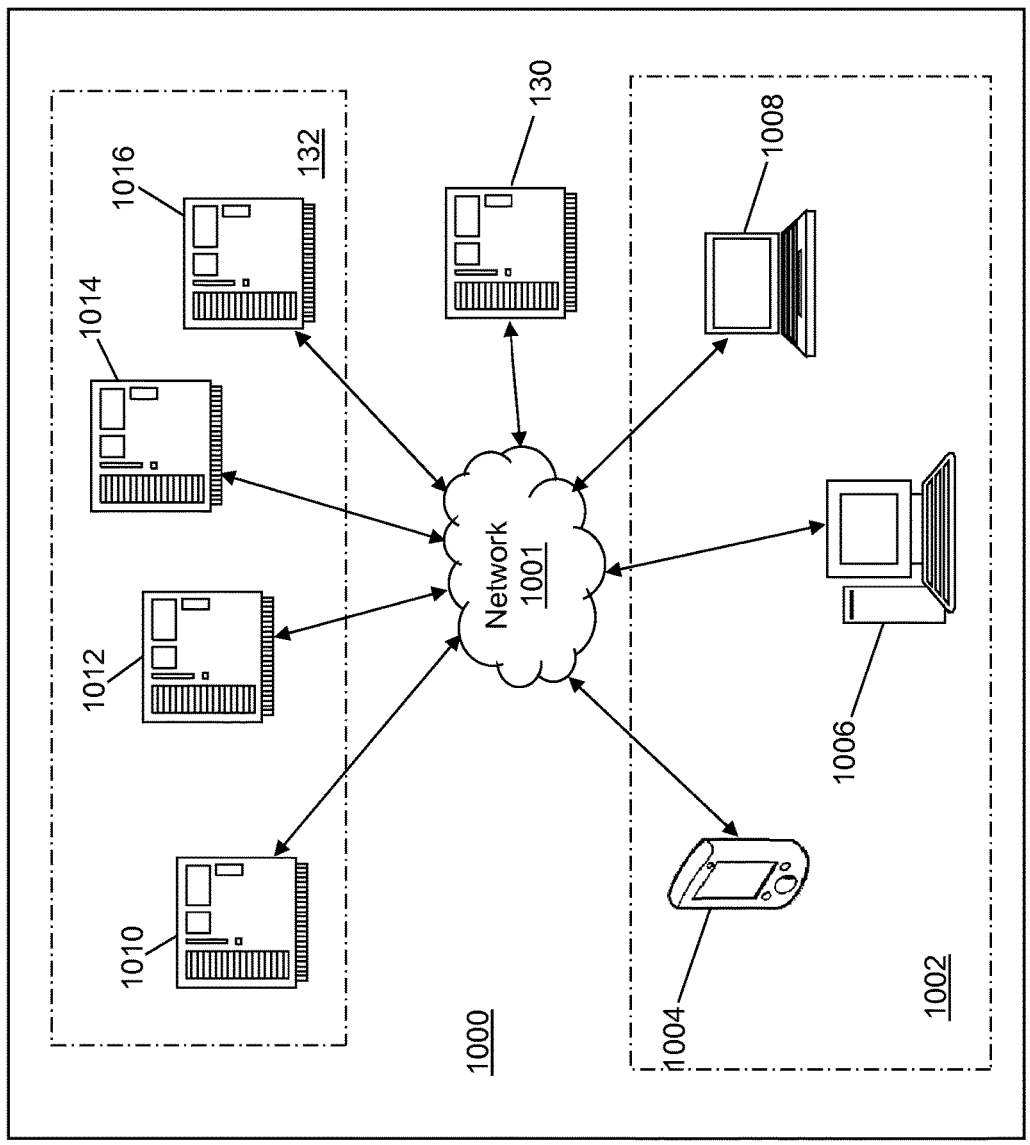
FIG. 10 depicts a block diagram of a distributed processing system in accordance with an illustrative embodiment.

For illustration, FIG. 10 represents grid systems 132 with a first server computer 1010, a second server computer 1012, a third server computer 1014, and a fourth server computer 1016. Grid systems 132 can include any number and form factor of computing devices that may be organized into subnets. The computing devices of grid systems 132 send and receive communications through network 1001 to/from another of the one or more computing devices of grid systems 132, to/from grid control device 130, and/or to/from data conversion systems 1002. The one or more computing devices of grid systems 132 may communicate using various transmission media that may be wired and/or wireless as understood by those skilled in the art.

In the illustrative embodiment, grid control device 130 is represented as a server computing device though grid control device 130 may include one or more computing devices of any form factor that may be organized into subnets. Grid control device 130 sends and receives communications through network 1001 to/from grid systems 132 and/or to/from data conversion systems 1002. Grid control device 130 may communicate using various transmission media that may be wired and/or wireless as understood by those skilled in the art.

Figure 11:
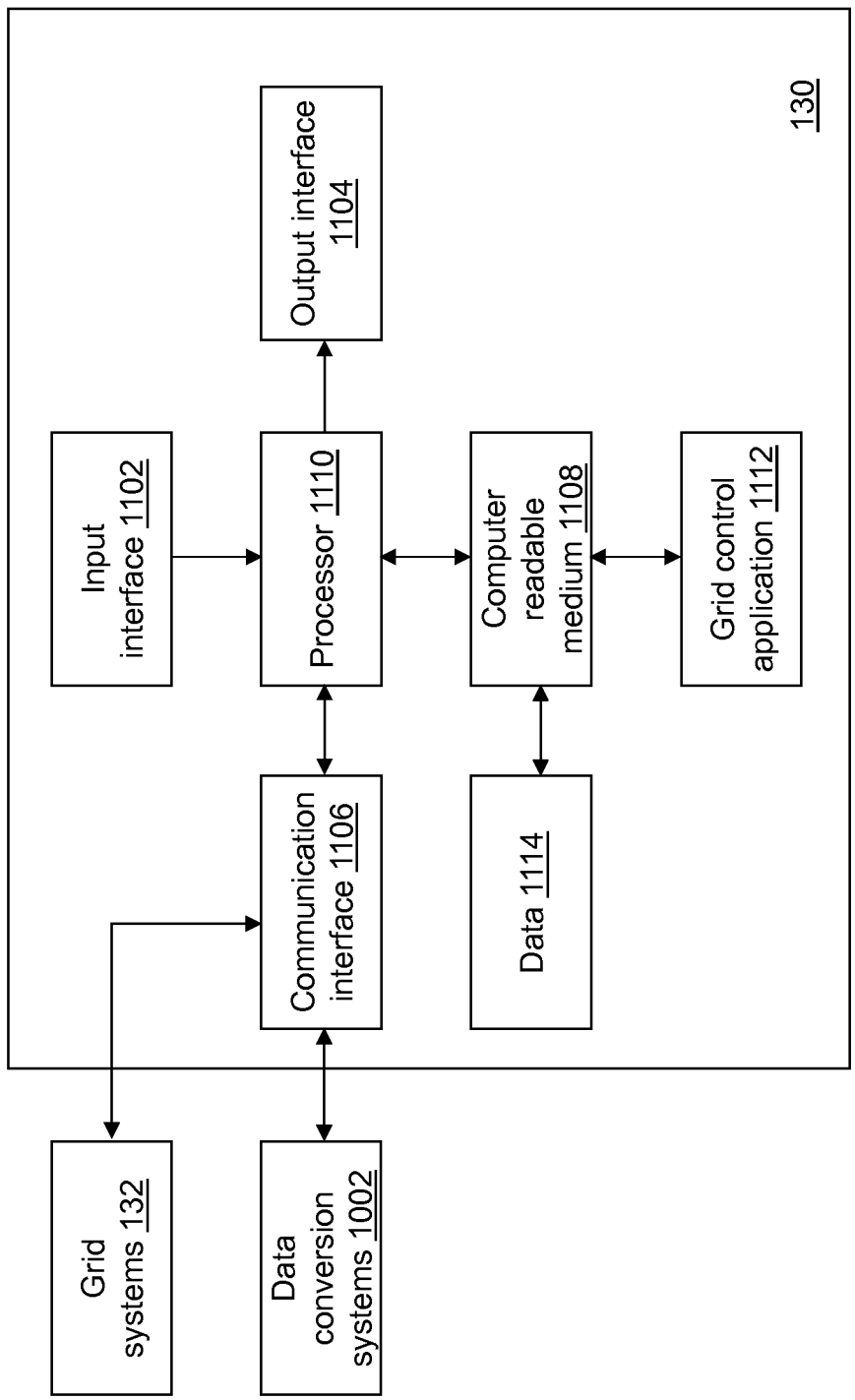
FIG. 11 depicts a block diagram of a grid control device of the distributed processing system of FIG. 10 in accordance with an illustrative embodiment.

Referring to FIG. 11, a block diagram of grid control device 130 is shown in accordance with an example embodiment. Grid control device 130 may include a second input interface 1102, a second output interface 1104, a second communication interface 1106, a second computer-readable medium 1108, a second processor 1110, a grid control application 1112, and data 1114. Fewer, different, and additional components may be incorporated into grid control device 130.

Second input interface 1102 provides the same or similar functionality as that described with reference to input interface 102 of data conversion device 100 though referring to grid control device 130. Second output interface 1104 provides the same or similar functionality as that described with reference to output interface 104 of data conversion device 100 though referring to grid control device 130. Second communication interface 1106 provides the same or similar functionality as that described with reference to communication interface 106 of data conversion device 100 though referring to grid control device 130. Data and messages may be transferred between grid control device 130 and grid systems 132 and/or data conversion systems 1002 using second communication interface 1106. Second computer-readable medium 1108 provides the same or similar functionality as that described with reference to computer-readable medium 108 of data conversion device 100 though referring to grid control device 130. Second processor 1110 provides the same or similar functionality as that described with reference to processor 110 of data conversion device 100 though referring to grid control device 130.

Grid control application 1112, for example, performs operations associated with controlling access to a portion of data matrix 124 or tree data 126 distributed across grid systems 132 and with creating tree data 126 and/or contingency table data at each of the one or more computing devices of grid systems 132. Data 1114 may comprise data used by grid control application 1112 in support of creating tree data 126 and/or using tree data 126 to create one or more contingency tables.

Some or all of the operations described herein may be embodied in grid control application 1112. The operations may be implemented using hardware, firmware, software, or any combination of these methods. Referring to the example embodiment of FIG. 11, grid control application 1112 is implemented in software (comprised of computer-readable and/or computer-executable instructions) stored in second computer-readable medium 1108 and accessible by second processor 1110 for execution of the instructions that embody the operations of grid control application 1112. Grid control application 1112 may be written using one or more programming languages, assembly languages, scripting languages, etc. Grid control application 1112 may be implemented as a Web application.

Referring to FIG. 12, example operations associated with grid control application 1112 are described. Additional, fewer, or different operations may be performed depending on the embodiment. The order of presentation of the operations of FIG. 12 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using threads.

Similar to operation 700, in an operation 1200, an eighth indicator of data to convert to tree data 126 is received. The eighth indicator may be received from a user of grid control device 130, from computer-readable medium 1108, or from data conversion device 100 through second communication interface 1106. The eighth indicator may be the same or different from the first indicator. For example, the eighth indicator may be a pointer to a data file; whereas, the first indicator may be a string identifying the data file name.

Similar to operation 702, in an operation 1202, a ninth indicator of variables to include in tree data 126 is received. The ninth indicator may be received from a user of grid control device 130, from computer-readable medium 1108, or from data conversion device 100 through second communication interface 1106. The ninth indicator may be the same or different from the second indicator.

Similar to operation 704, in an operation 1204, a tenth indicator of a variable ordering method is received. Similar to operation 706, in an operation 1206, the variable order is defined based on the variable ordering method defined in operation 1204 or by default based on the column number. In an alternative embodiment, the tenth indicator may not be received. The variable ordering may be determined by data conversion device 100 and received by grid control device 130 from data conversion device 100 in operation 1206.

In an operation 1208, an eleventh indicator associated with data leveling is received. For example, the eleventh indicator may indicate whether or not the data stored in data matrix 124 is to be levelized.

In an operation 1210, a request is sent to each of the one or more computing devices of grid systems 132. For example, the request may include the eighth indicator, the ninth indicator, the defined variable order, any levelizing information, etc. Distributed execution of tree data creation application 122 may be performed using each of the one or more computing devices of grid systems 132. For example, each of the one or more computing devices of grid systems 132 may execute one or more of the operations described with reference to FIGS. 7a-7c using a data subset 1414 (shown referring to FIG. 14). The first, second, and third indicators may be received from grid control device 130.

In an operation 1212, a tenth indicator is received from each of the one or more computing devices of grid systems 132. The tenth indicator may indicate that tree data 126 has been created at each of the one or more computing devices of grid systems 132. The tenth indicator further may include tree data 126 created at each of the one or more computing devices of grid systems 132. The tree data 126 received from each of the one or more computing devices of grid systems 132 may be stored on second computer-readable medium 1108.

In an operation 1214, an eleventh indicator is sent to data conversion device 100. The eleventh indicator may indicate that tree data 126 has been created at each of the one or more computing devices of grid systems 132. The eleventh indicator further may include tree data 126 created at each of the one or more computing devices of grid systems 132. The tree data 126 received from each of the one or more computing devices of grid systems 132 may be stored on computer-readable medium 108.

Referring to FIG. 13, additional example operations associated with grid control application 1112 are described. Additional, fewer, or different operations may be performed depending on the embodiment. The order of presentation of the operations of FIG. 13 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using threads.

Similar to operation 900, in an operation 1300, a twelfth indicator of tree data to use is received. The twelfth indicator may be received from a user of grid control device 130, from computer-readable medium 1108, or from data conversion device 100 through second communication interface 1106. The twelfth indicator may be the same or different from the fourth indicator.

Similar to operation 902, in an operation 1302, a thirteenth indicator of variables to include in the tree data is received. The thirteenth indicator may be received from a user of grid control device 130, from computer-readable medium 1108, or from data conversion device 100 through second communication interface 1106. The thirteenth indicator may be the same or different from the fifth indicator.

Similar to operation 904, in an operation 1304, a fourteenth indicator of a variable order is received. The fourteenth indicator may be received from a user of grid control device 130, from computer-readable medium 1108, or from data conversion device 100 through second communication interface 1106. The fourteenth indicator may be the same or different from the sixth indicator.

In an operation 1306, a request is sent to each of the one or more computing devices of grid systems 132. For example, the request may include the twelfth indicator, the thirteenth indicator, the fourteenth indicator, etc. Distributed execution of use tree data application 800 may be performed using each of the one or more computing devices of grid systems 132. For example, each of the one or more computing devices of grid systems 132 may execute one or more of the operations described with reference to FIGS. 9a-9d using a data tree subset 1416 (shown referring to FIG. 14). The fourth, fifth, sixth, and seventh indicators may be received from grid control device 130.

In an operation 1308, a fifteenth indicator is received from each of the one or more computing devices of grid systems 132. The fifteenth indicator may include the one or more contingency tables created at each of the one or more computing devices of grid systems 132. The one or more contingency tables received from each of the one or more computing devices of grid systems 132 may be stored on second computer-readable medium 1108.

In an operation 1310, the contingency table data received from each of the one or more computing devices of grid systems 132 is combined to form a single contingency table for each variable pair. For example, an overall frequency count value is determined for each variable value combination by adding the frequency count values from each matching variable value combination in each contingency table.

In an operation 1312, a sixteenth indicator is sent to data conversion device 100. The sixteenth indicator may indicate that the one or more contingency tables have been created. The sixteenth indicator further may include the one or more combined contingency tables. The one or more combined contingency tables may be stored on computer-readable medium 108.

Figure 14:
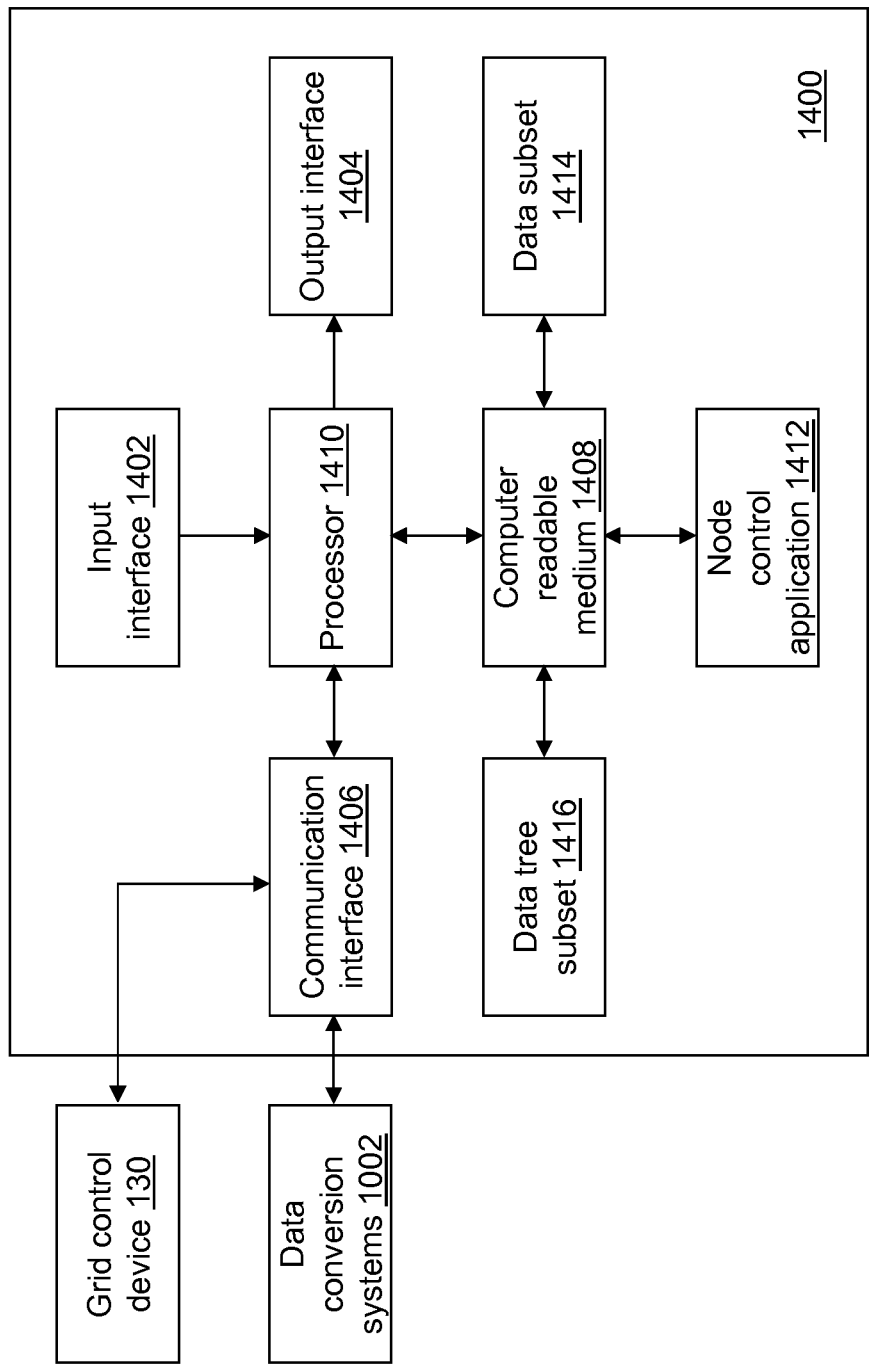
FIG. 14 depicts a block diagram of a grid node device of the distributed processing system of FIG. 10 in accordance with an illustrative embodiment.

Referring to FIG. 14, a block diagram of a grid node device 1400 is shown in accordance with an illustrative embodiment. Grid node device 1400 is an example computing device of grid systems 132. Grid node device 1400 may include a third input interface 1402, a third output interface 1404, a third communication interface 1406, a third computer-readable medium 1408, a third processor 1410, a node control application 1412, data subset 1414, and data tree subset 1416. Fewer, different, and additional components may be incorporated into grid node device 1400.

Third input interface 1402 provides the same or similar functionality as that described with reference to input interface 102 of data conversion device 100 though referring to grid node device 1400. Third output interface 1404 provides the same or similar functionality as that described with reference to output interface 104 of data conversion device 100 though referring to grid node device 1400. Third communication interface 1406 provides the same or similar functionality as that described with reference to communication interface 106 of data conversion device 100 though referring to grid node device 1400. Data and messages may be transferred between grid node device 1400 and grid control device 130 and/or the data conversion systems 1002 using third communication interface 1406. Third computer-readable medium 1408 provides the same or similar functionality as that described with reference to computer-readable medium 108 of data conversion device 100 though referring to grid node device 1400. Third processor 1410 provides the same or similar functionality as that described with reference to processor 110 of data conversion device 100 though referring to grid node device 1400.

Node control application 1412 performs operations associated with creating data tree subset 1416 from data subset 1414 and/or with creating the one or more contingency tables from data tree subset 1416. Some or all of the operations described herein may be embodied in node control application 1412. The operations may be implemented using hardware, firmware, software, or any combination of these methods. Referring to the example embodiment of FIG. 14, node control application 1412 is implemented in software (comprised of computer-readable and/or computer-executable instructions) stored in third computer-readable medium 1408 and accessible by third processor 1410 for execution of the instructions that embody the operations of node control application 1412. Node control application 1412 may be written using one or more programming languages, assembly languages, scripting languages, etc. Node control application 1412 may be implemented as a Web application.

Data subset 1414 stores a portion of data matrix 124 with each computing device of the grid systems 132 storing a different portion of data matrix 124. Grid control device 130 further may store a portion of data matrix 124. Data tree subset 1416 stores a portion of data tree 126 with each computing device of the grid systems 132 storing a different portion of data tree 126. Grid control device 130 further may store a portion of data tree 126.

A user may execute tree data creation application 122 that interacts with grid control application 1112 by requesting that grid control device 130 create tree data 126. A user may execute use tree data application 800 that interacts with grid control application 1112 by requesting that grid control device 130 use tree data 126 to create contingency tables. Grid control application 1112 triggers processing by node control application 1412 executing at each grid node of the grid systems 132. Any number of different users may be accessing data matrix 124 and/or data tree 126 at any given time.

Various levels of integration between the components of distributed processing system 1000 may be implemented without limitation as understood by a person of skill in the art. For example, node control application 1412 and grid control application 1112 may be the same or different applications or part of an integrated, distributed application supporting some or all of the same or additional types of functionality as described herein. As another example, tree data creation application 122, use tree data application 800, and grid control application 1112 may be the same or different applications or part of an integrated, distributed application supporting some or all of the same or additional types of functionality as described herein.

Constructing contingency tables is a common task for many applications associated with data mining. In data mining, a contingency table is a useful tool to build decision trees, learn Bayesian networks, or mine frequent patterns etc. Data mining has been used widely in the areas of science and engineering, such as bioinformatics, genetics, medicine, sensors, education and electrical power engineering, etc. By accelerating the counting task of constructing contingency tables and reducing an amount of memory to store data in a useable form for constructing contingency tables, statistical analysis of the data can be made more efficient.

In the described tree data, each node stores a variable, a level of the variable, a frequency count value, and a pointer to an observation. The order of the variables is preset from the root node to each leaf node. Nodes that store the same variable are linked together (shown by solid links in FIGS. 2-6). Some nodes can be suppressed. Such suppressed nodes are linked together for each variable also (shown by dashed links in FIGS. 2-6).

The number of nodes in the tree data is bounded by $2n$, where n is the number of observations, because for each observation no more than two nodes are added to the tree data. The memory requirement for the described tree data does not depend on the number of variables or on the levels of the variables making it suitable for handling high-dimensional data. The contingency tables can be efficiently constructed by traversing the links in the tree data and checking the observations. Additional discussion of improvements resulting from the described tree data can be found in U.S. Provisional Patent Application Nos. 61/990,097 and 62/002,183 incorporated herein by reference.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   receive a first variable indicator that indicates a first variable to include in a contingency table;
   receive a second variable indicator that indicates a second variable to include in the contingency table;
   determine when a variable level list exists for the second variable in tree data;
   when the variable level list exists for the second variable in the tree data,
      determine a first node memory structure for the second variable from the variable level list, wherein the first node memory structure includes a first value indicator, a first counter value, and a first observation indicator, wherein the first value indicator indicates a first value of the second variable;
      determine a first value of the first variable using the first observation indicator and the tree data; and
      add the first counter value to the contingency table in association with the first value of the first variable and the first value of the second variable;
   determine a third variable closer to a root node than the second variable and farther from the root node than the first variable in the tree data;
   determine when a suppressed variable level list exists for the third variable in the tree data: and
   when the suppressed variable level list exists for the third variable in the tree data,
      determine a second node memory structure for the third variable from the suppressed variable level list, wherein the second node memory structure includes a second counter value and a second observation indicator;
      determine a second value of the first variable using the second observation indicator and the tree data;
      determine a second value of the second variable using the second observation indicator and the tree data; and
      add the second counter value to the contingency table in association with the second value of the first variable and the second value of the second variable.

2. The non-transitory computer-readable medium of claim 1, wherein the first variable has a higher priority than the second variable.

3. The non-transitory computer-readable medium of claim 2, wherein the first variable is a target variable of a plurality of variables.

4. The non-transitory computer-readable medium of claim 1, wherein the first value of the first variable is an integer value that maps to an original attribute value.

5. The non-transitory computer-readable medium of claim 1, wherein the tree data includes a plurality of variables and the first variable and the second variable are included in the plurality of variables.

6. The non-transitory computer-readable medium of claim 1, wherein the first variable has a higher priority than the second variable and the third variable, and the third variable has a higher priority than the second variable.

7. The non-transitory computer-readable medium of claim 1, wherein the computer-readable instructions further cause the computing device to:
   determine a fourth variable closer to the root node than the third variable and farther from the root node than the first variable in the tree data;
   determine when a second suppressed variable level list exists for the fourth variable in the tree data; and
   when the second suppressed variable level list exists for the fourth variable in the tree data,
      determine a third node memory structure for the fourth variable from the second suppressed variable level list, wherein the third node memory structure includes a third counter value and a third observation indicator;
      determine a third value of the first variable using the third observation indicator and the tree data;
      determine a third value of the second variable using the third observation indicator and the tree data; and
      add the third counter value to the contingency table in association with the third value of the first variable and the third value of the second variable.

8. The non-transitory computer-readable medium of claim 1, wherein the computer-readable instructions further cause the computing device to:
   determine when the suppressed variable level list includes another node memory structure; and
   while the suppressed variable level list includes another node memory structure,
      determine a next node memory structure for the third variable from the suppressed variable level list, wherein the next node memory structure includes a third counter value and a third observation indicator;
      determine a third value of the first variable using the third observation indicator and the tree data;
      determine a third value of the second variable using the third observation indicator and the tree data; and
      add the third counter value to the contingency table in association with the third value of the first variable and the third value of the second variable.

9. A computing device comprising:
   a processor; and
   a non-transitory computer-readable medium operably coupled to the processor, the computer-readable medium having computer-readable instructions stored thereon that, when executed by the processor, cause the computing device to
   receive a first variable indicator that indicates a first variable to include in a contingency table;

receive a second variable indicator that indicates a second variable to include in the contingency table;
determine when a variable level list exists for the second variable in tree data;
when the variable level list exists for the second variable in the tree data,
  determine a first node memory structure for the second variable from the variable level list, wherein the first node memory structure includes a first value indicator, a first counter value, and a first observation indicator, wherein the first value indicator indicates a first value of the second variable;
  determine a first value of the first variable using the first observation indicator and the tree data; and
  add the first counter value to the contingency table in association with the first value of the first variable and the first value of the second variable;
determine a third variable closer to a root node than the second variable and farther from the root node than the first variable in the tree data;
determine when a suppressed variable level list exists for the third variable in the tree data; and
when the suppressed variable level list exists for the third variable in the tree data,
  determine a second node memory structure for the third variable from the suppressed variable level list, wherein the second node memory structure includes a second counter value and a second observation indicator;
  determine a second value of the first variable using the second observation indicator and the tree data;
  determine a second value of the second variable using the second observation indicator and the tree data; and
  add the second counter value to the contingency table in association with the second value of the first variable and the second value of the second variable.

10. The computing device of claim 9, wherein the computer-readable instructions further cause the computing device to:
determine a fourth variable closer to the root node than the third variable and farther from the root node than the first variable in the tree data;
determine when a second suppressed variable level list exists for the fourth variable in the tree data; and
when the second suppressed variable level list exists for the fourth variable in the tree data,
  determine a third node memory structure for the fourth variable from the second suppressed variable level list, wherein the third node memory structure includes a third counter value and a third observation indicator;
  determine a third value of the first variable using the third observation indicator and the tree data;
  determine a third value of the second variable using the third observation indicator and the tree data; and
  add the third counter value to the contingency table in association with the third value of the first variable and the third value of the second variable.

11. The computing device of claim 9, wherein the computer-readable instructions further cause the computing device to:
determine when the suppressed variable level list includes another node memory structure; and
while the suppressed variable level list includes another node memory structure,
  determine a next node memory structure for the third variable from the suppressed variable level list, wherein the next node memory structure includes a third counter value and a third observation indicator;
  determine a third value of the first variable using the third observation indicator and the tree data;
  determine a third value of the second variable using the third observation indicator and the tree data; and
  add the third counter value to the contingency table in association with the third value of the first variable and the third value of the second variable.

12. A method of creating a contingency table, the method comprising:
receiving a first variable indicator that indicates a first variable to include in a contingency table;
receiving a second variable indicator that indicates a second variable to include in the contingency table;
determining, by a computing device, when a variable level list exists for the second variable in tree data; and
when the variable level list exists for the second variable in the tree data,
  determining, by the computing device, a first node memory structure for the second variable from the variable level list, wherein the first node memory structure includes a first value indicator, a first counter value, and a first observation indicator, wherein the first value indicator indicates a first value of the second variable;
  determining, by the computing device, a first value of the first variable using the first observation indicator and the tree data; and
  adding, by the computing device, the first counter value to the contingency table in association with the first value of the first variable and the first value of the second variable;
determining, by the computing device, a third variable closer to a root node than the second variable and farther from the root node than the first variable in the tree data;
determining, by the computing device, when a suppressed variable level list exists for the third variable in the tree data; and
when the suppressed variable level list exists for the third variable in the tree data,
  determining, by the computing device, a second node memory structure for the third variable from the suppressed variable level list, wherein the second node memory structure includes a second counter value and a second observation indicator;
  determining, by the computing device, a second value of the first variable using the second observation indicator and the tree data;
  determining, by the computing device, a second value of the second variable using the second observation indicator and the tree data; and
  adding, by the computing device, the second counter value to the contingency table in association with the second value of the first variable and the second value of the second variable.

13. The method of claim 12, further comprising:
determining, by the computing device, a fourth variable closer to the root node than the third variable and farther from the root node than the first variable in the tree data;

determining, by the computing device, when a second suppressed variable level list exists for the fourth variable in the tree data; and
when the second suppressed variable level list exists for the fourth variable in the tree data,
determining, by the computing device, a third node memory structure for the fourth variable from the second suppressed variable level list, wherein the third node memory structure includes a third counter value and a third observation indicator;
determining, by the computing device, a third value of the first variable using the third observation indicator and the tree data;
determining, by the computing device, a third value of the second variable using the third observation indicator and the tree data; and
adding, by the computing device, the third counter value to the contingency table in association with the third value of the first variable and the third value of the second variable.

14. The method of claim 12, wherein the first variable has a higher priority than the second variable and the third variable, and the third variable has a higher priority than the second variable.

15. The method of claim 12, further comprising:
determining, by the computing device, when the suppressed variable level list includes another node memory structure; and
while the suppressed variable level list includes another node memory structure,
determining, by the computing device, a next node memory structure for the third variable from the suppressed variable level list, wherein the next node memory structure includes a third counter value and a third observation indicator;
determining, by the computing device, a third value of the first variable using the third observation indicator and the tree data;
determining, by the computing device, a third value of the second variable using the third observation indicator and the tree data; and
adding, by the computing device, the third counter value to the contingency table in association with the third value of the first variable and the third value of the second variable.

16. A non-transitory computer-readable medium having stored thereon computer-readable instructions that when executed by a computing device cause the computing device to:
receive a first variable indicator that indicates a first variable to include in a contingency table;
receive a second variable indicator that indicates a second variable to include in the contingency table;
determine when a variable level list exists for the second variable in tree data;
when the variable level list exists for the second variable in the tree data,
determine a first node memory structure for the second variable from the variable level list, wherein the first node memory structure includes a first value indicator, a first counter value, and a first observation indicator, wherein the first value indicator indicates a first value of the second variable;
determine a first value of the first variable using the first observation indicator and the tree data; and
add the first counter value to the contingency table in association with the first value of the first variable and the first value of the second variable;
determine when the variable level list includes another node memory structure; and
while the variable level list includes another node memory structure,
determine a next node memory structure for the second variable from the variable level list, wherein the next node memory structure includes a second value indicator, a second counter value, and a second observation indicator, wherein the second value indicator indicates a second value of the second variable;
determine a second value of the first variable using the second observation indicator and the tree data; and
add the second counter value to the contingency table in association with the second value of the first variable and the second value of the second variable.

17. The non-transitory computer-readable medium of claim 16, wherein the second value of the first variable is equal to the first value of the first variable.

18. The non-transitory computer-readable medium of claim 16, wherein the second value of the second variable is equal to the first value of the second variable.

19. The non-transitory computer-readable medium of claim 16, wherein the first variable has a higher priority than the second variable.

20. A computing device comprising:
a processor; and
a non-transitory computer-readable medium operably coupled to the processor, the computer-readable medium having computer-readable instructions stored thereon that, when executed by the processor, cause the computing device to
receive a first variable indicator that indicates a first variable to include in a contingency table;
receive a second variable indicator that indicates a second variable to include in the contingency table;
determine when a variable level list exists for the second variable in tree data;
when the variable level list exists for the second variable in the tree data,
determine a first node memory structure for the second variable from the variable level list, wherein the first node memory structure includes a first value indicator, a first counter value, and a first observation indicator, wherein the first value indicator indicates a first value of the second variable;
determine a first value of the first variable using the first observation indicator and the tree data; and
add the first counter value to the contingency table in association with the first value of the first variable and the first value of the second variable;
determine when the variable level list includes another node memory structure; and
while the variable level list includes another node memory structure,
determine a next node memory structure for the second variable from the variable level list, wherein the next node memory structure includes a second value indicator, a second counter value, and a second observation indicator, wherein the second value indicator indicates a second value of the second variable;

determine a second value of the first variable using the second observation indicator and the tree data; and add the second counter value to the contingency table in association with the second value of the first variable and the second value of the second variable.

21. The computing device of claim 20, wherein the second value of the first variable is equal to the first value of the first variable.

22. The computing device of claim 20, wherein the second value of the second variable is equal to the first value of the second variable.

23. The computing device of claim 20, wherein the first variable has a higher priority than the second variable.

24. A method of creating a contingency table, the method comprising:

receiving a first variable indicator that indicates a first variable to include in a contingency table;

receiving a second variable indicator that indicates a second variable to include in the contingency table;

determining, by a computing device, when a variable level list exists for the second variable in tree data;

when the variable level list exists for the second variable in the tree data, determining, by the computing device, a first node memory structure for the second variable from the variable level list, wherein the first node memory structure includes a first value indicator, a first counter value, and a first observation indicator, wherein the first value indicator indicates a first value of the second variable;

determining, by the computing device, a first value of the first variable using the first observation indicator and the tree data; and adding, by the computing device, the first counter value to the contingency table in association with the first value of the first variable and the first value of the second variable;

determining, by the computing device, when the variable level list includes another node memory structure; and while the variable level list includes another node memory structure, determining, by the computing device, a next node memory structure for the second variable from the variable level list, wherein the next node memory structure includes a second value indicator, a second counter value, and a second observation indicator, wherein the second value indicator indicates a second value of the second variable;

determining, by the computing device, a second value of the first variable using the second observation indicator and the tree data; and adding, by the computing device, the second counter value to the contingency table in association with the second value of the first variable and the second value of the second variable.

25. The method of claim 24, wherein the second value of the first variable is equal to the first value of the first variable.

26. The method of claim 24, wherein the second value of the second variable is equal to the first value of the second variable.

27. The method of claim 24, wherein the first variable has a higher priority than the second variable.

* * * * *

UNITED STATES PATENT AND TRADEMARK OFFICE
CERTIFICATE OF CORRECTION

PATENT NO. : 9,734,179 B2  
APPLICATION NO. : 14/571756  
DATED : August 15, 2017  
INVENTOR(S) : Yongqiao Xiao et al.

Page 1 of 1

It is certified that error appears in the above-identified patent and that said Letters Patent is hereby corrected as shown below:

In the Claims

Claim 1, Column 29, Line 51:
Delete "third variable in the tree data: and" and replace with --third variable in the tree data; and--

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*